United States Patent
Yu et al.

(10) Patent No.: US 11,325,522 B2
(45) Date of Patent: May 10, 2022

(54) AUTOMATIC LIGHT SYSTEM

(71) Applicant: Hitachi Automotive Systems, Ltd., Hitachinaka (JP)

(72) Inventors: Zihan Yu, Hitachinaka (JP); Takakiyo Yasukawa, Hitachinaka (JP); Tatsuhiko Monji, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 16/976,613

(22) PCT Filed: Mar. 4, 2019

(86) PCT No.: PCT/JP2019/008272
§ 371 (c)(1),
(2) Date: Aug. 28, 2020

(87) PCT Pub. No.: WO2019/176604
PCT Pub. Date: Sep. 19, 2019

(65) Prior Publication Data
US 2021/0001767 A1  Jan. 7, 2021

(30) Foreign Application Priority Data

Mar. 14, 2018 (JP) .............................. JP2018-046236

(51) Int. Cl.
*B60Q 1/00* (2006.01)
*F21V 21/28* (2006.01)
(Continued)

(52) U.S. Cl.
CPC .................. *B60Q 1/08* (2013.01); *G06T 7/90* (2017.01); *B60Q 2300/314* (2013.01); *G06T 2207/10024* (2013.01); *G06T 2207/30252* (2013.01)

(58) Field of Classification Search
CPC .... B60Q 1/08; B60Q 2300/314; B60Q 1/085; B60Q 2300/112; B60Q 2300/122;
(Continued)

(56) References Cited

U.S. PATENT DOCUMENTS

2006/0086892 A1* 4/2006 Chen .................... B60Q 1/1423
250/214 R
2008/0007180 A1* 1/2008 Kesterson ................ B60Q 1/38
315/82
(Continued)

FOREIGN PATENT DOCUMENTS

JP  2005-075304 A  3/2005
JP  2008-110715 A  5/2008
(Continued)

OTHER PUBLICATIONS

International Search Report with English translation and Written Opinion issued in corresponding application No. PCT/JP2019/008272 dated Jun. 11, 2019.

*Primary Examiner* — Tuyen K Vo
(74) *Attorney, Agent, or Firm* — Foley & Lardner LLP

(57) ABSTRACT

An automatic light system is provided for automatically turning on and off vehicle lights in accordance with the surrounding environment. The system includes an imaging device that images an area in front of the vehicle and generates image data; an image processing unit that generates light mode information on the basis of the brightness in an upper region and lower region of the image data; and a light control unit that controls the lights on the basis of the light mode information. The image processing unit sets a higher weight to a measurement region in the movement direction of the vehicle from among a plurality of measurement regions set in the upper region and a lower weight to the other measurement regions to calculate the brightness in (Continued)

the upper region and generates the light mode information on the basis of the brightness in the upper region.

9 Claims, 24 Drawing Sheets

(51) Int. Cl.
  *F21V 21/29* (2006.01)
  *B60Q 1/08* (2006.01)
  *G06T 7/90* (2017.01)
(58) Field of Classification Search
  CPC .............. B60Q 2300/41; B60Q 2400/30; B60Q 1/143; G06T 7/90; G06T 2207/10024; G06T 2207/30252; G06K 9/4661; G06K 9/00791
  See application file for complete search history.

(56) References Cited

U.S. PATENT DOCUMENTS

| | | |
|---|---|---|
| 2008/0100225 A1 | 5/2008 | Fujie |
| 2009/0152449 A1* | 6/2009 | Goto .................. G01J 1/06 250/214 R |
| 2009/0323366 A1 | 12/2009 | Furusawa |
| 2010/0295450 A1* | 11/2010 | Oishi ................ B60Q 1/143 315/77 |
| 2013/0116857 A1 | 5/2013 | Mitsugi |
| 2017/0355300 A1* | 12/2017 | Kurata ............ G06K 9/00825 |

FOREIGN PATENT DOCUMENTS

| | | |
|---|---|---|
| JP | 2009-255722 A | 11/2009 |
| JP | 2010-006172 A | 1/2010 |
| JP | 2015-071403 A | 4/2015 |
| WO | WO-2012/066609 A1 | 5/2012 |

* cited by examiner

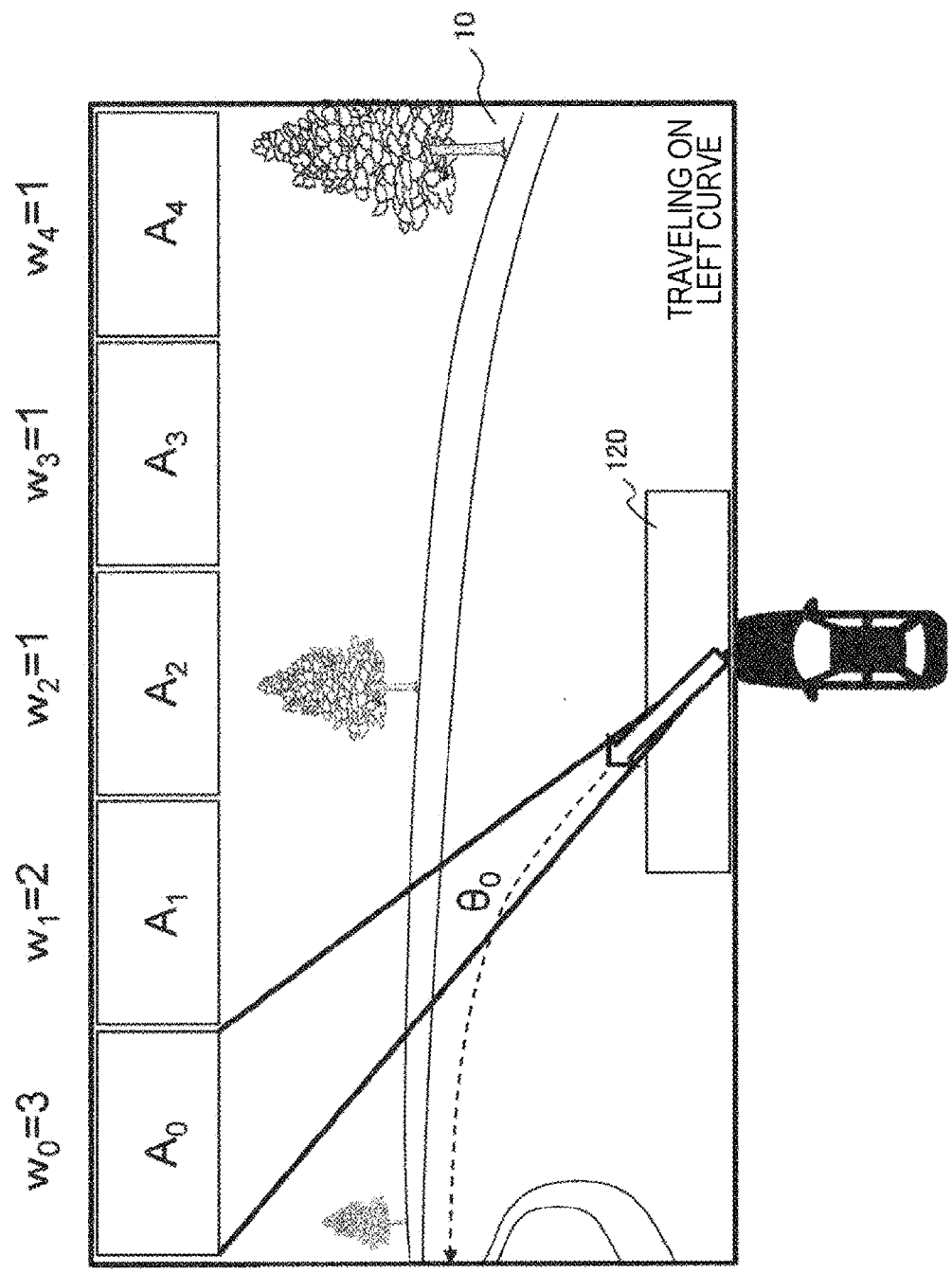

(a)  (b)

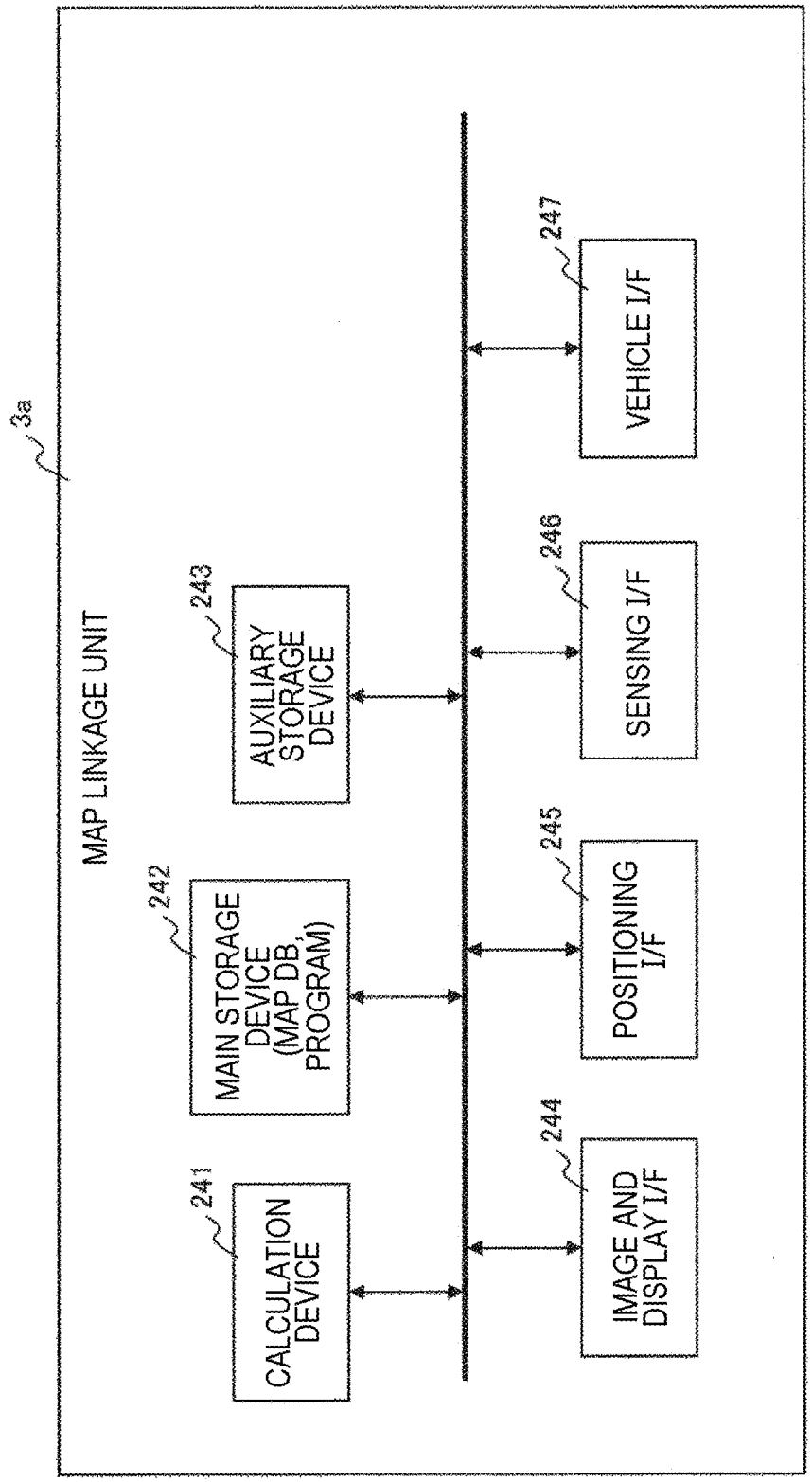

AUTOMATIC LIGHT SYSTEM

TECHNICAL FIELD

The present invention relates to an automatic light system that automatically turns on or off lights of a vehicle in accordance with surrounding environment.

BACKGROUND ART

The Safety Standards of the Road Transportation Vehicles revised in October 2016 requires mounting of an "auto light function" in a novel passenger vehicle that will start to be sold in or after April 2020. The "auto light function" required by the standards is that lights are automatically turned on within 2 seconds in a case where illuminance of surrounding environment is less than 1000 [1x], and automatically turned off within a range of 5 to 300 seconds in a case where illuminance of surrounding environment exceeds 7000 [1x].

Here, as a conventional automatic light system for automobile, there is a system that detects illuminance outside a vehicle by using a vehicle-mounted camera and automatically turns on or off lights, accordingly.

For example, Abstract of PTL 1 describes "An auto lighting system 1 includes imaging means 2 for capturing an image of the road ahead of a vehicle and lighting control means 3 for turning on or off lights such as headlights based on the image of the road ahead of the vehicle captured with the imaging means 2. The brightness ahead of the vehicle as perceived by the driver is recognized based on the image of the road ahead of the vehicle captured with the imaging means 2, and lighting control in which lights 101 are turned on or off is performed based on the brightness ahead of the vehicle.", and discloses a technique to automatically turn on or off lights according to according to brightness of a front of an own vehicle.

CITATION LIST

Patent Literature

PTL 1: JP 2010-6172 A

SUMMARY OF INVENTION

Technical Problem

Here, in the conventional technique of PTL 1, as described in claim 8 or FIG. 7 of the document for example, brightness of light in surrounding environment is predicted mainly on the basis of imaging data of a road surface. In this case, because brightness to be calculated changes moment by moment by influence of condition of road surface paint, a shadow of a building or under an overpass, presence of a preceding vehicle, or the like, influence of noise caused by those is removed with averaging processing of a predetermined time, or the like. However, the following items still remain as problems.

First, if detection of a road region, such as influence of a road state, road color, or a preceding vehicle, cannot be performed correctly during normal travel, erroneous operation of automatic lighting may occur. For example, in a case where a steering angle is large such as when traveling on a sharp curve, a road surface state imaged by a vehicle-mounted camera changes significantly in a short period of time, and therefore judgment of brightness of surrounding environment may become inappropriate, causing a delay in timing of turning on headlights.

Furthermore, in a case where an inter-vehicle distance to a preceding vehicle is short and a proportion of the preceding vehicle occupying image data in the vehicle-mounted camera is large, also, the road surface cannot be imaged sufficiently, and a light mode set on the basis of the image data may not become appropriate.

The present invention has been made in view of the above problems, and an object of the present invention is to provide an automatic light system that is capable of setting an appropriate light mode even in a case where a vehicle travels on a sharp curve or where an inter-vehicle distance to a preceding vehicle is short.

Solution to Problem

In order to solve the above problems, an automatic light system of the present invention automatically turns on or turns off lights of a vehicle in accordance with surrounding environment, the automatic light system including an imaging device that images an area in front of the vehicle and generates image data, an image processing unit that generates light mode information, with which turning on or turning off of the lights is controlled, on the basis of brightness in an upper region and lower region of the image data, and a light control unit that controls the lights on the basis of the light mode information, in which the image processing unit sets a higher weight to a measurement region in a movement direction of the vehicle from among a plurality of measurement regions set in the upper region and a lower weight to another measurement region to calculate the brightness in the upper region, and generates the light mode information on the basis of the brightness in the upper region.

Advantageous Effects of Invention

With an automatic light system according to the present invention, an appropriate light mode can be set even in a case where a vehicle travels on a sharp curve or where an inter-vehicle distance to a preceding vehicle is short.

BRIEF DESCRIPTION OF DRAWINGS

FIG. 7 is an example of weighting calculation for the upper measurement region based on a movement direction of the own vehicle.

FIG. 24 is a block diagram of a map linkage unit in the fourth embodiment.

DESCRIPTION OF EMBODIMENTS

Hereinafter, embodiments of an automatic light system of the present invention will be described in detail on the basis of the drawings.

First Embodiment

An automatic light system according to a first embodiment of the present invention will be described by using FIGS. 1 to 15.

Figure 1:
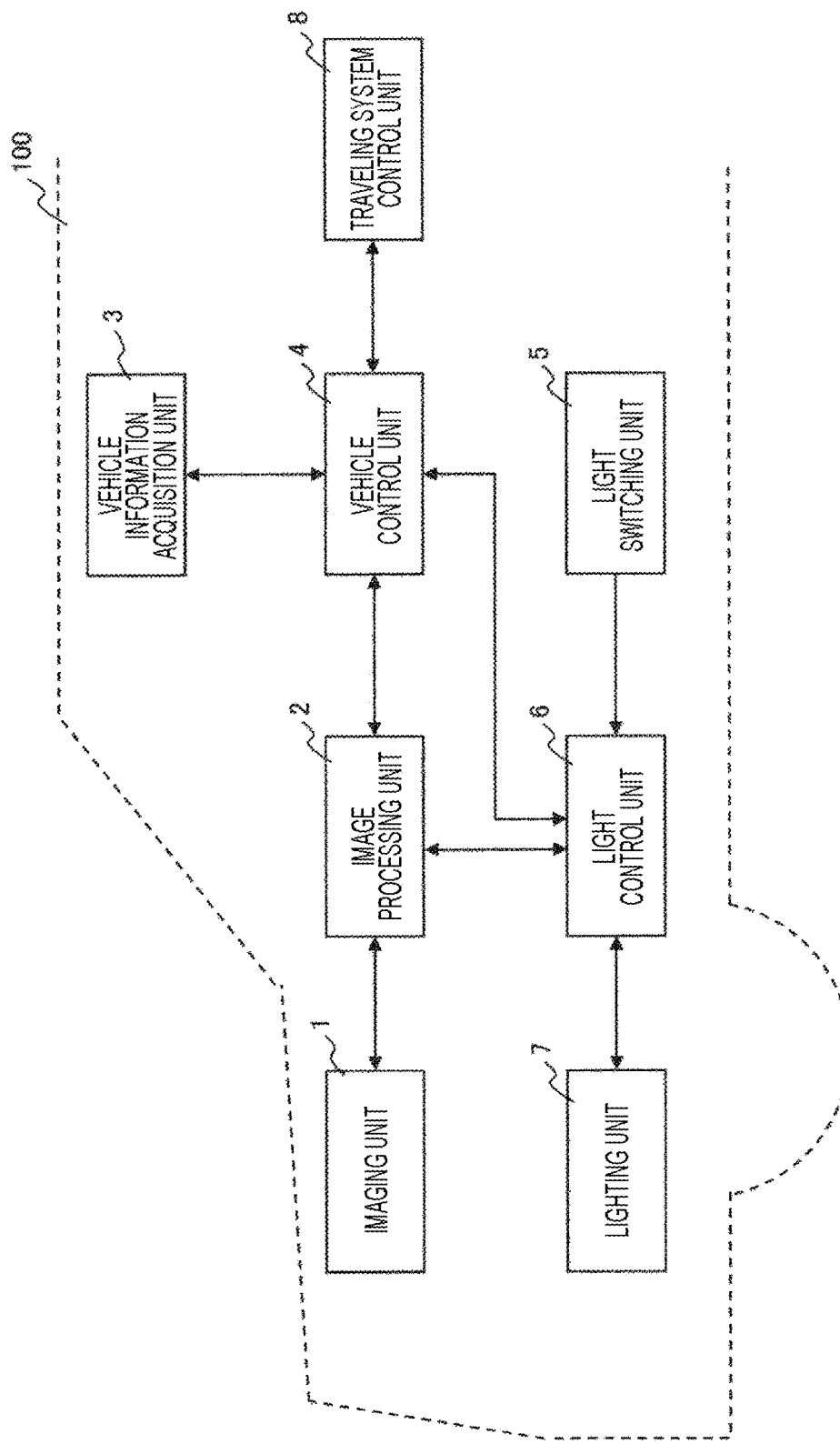
FIG. 1 is a functional block diagram according to a first embodiment.

FIG. 1 is a functional block diagram of an automatic light system of the present embodiment, the automatic light system being mounted on a vehicle 100. As illustrated here, this automatic light system includes an imaging unit 1, an image processing unit 2, a vehicle information acquisition unit 3, a vehicle control unit 4, a light switching unit 5, a light control unit 6, a lighting unit 7, and a traveling system control unit 8, which are mutually connected to each other via a controller area network (CAN) that is a kind of vehicle bus.

The imaging unit 1 generates image data 10 of an area similar to an area that a driver of the vehicle 100 visually recognizes while driving, and the imaging unit 1 is, for example, a monocular camera set at a tip of the vehicle 100. The image data 10 imaged by the imaging unit is transmitted to the image processing unit 2 and recorded.

The image processing unit 2 functions as an electronic control unit (ECU) for camera control also, and controls behavior of the imaging unit 1 by transmitting setting information of imaging timing, imaging time, or the like of the imaging unit 1. Furthermore, the image processing unit 2 generates light mode information corresponding to the image data 10 and transmits the light mode information to the light control unit 6, and details of processing of these will be described later.

The vehicle information acquisition unit 3 acquires vehicle information of speed, a steering angle, or the like of the vehicle 100 via the CAN, or the like, described above, and transmits the vehicle information to the vehicle control unit 4.

The vehicle control unit 4 outputs an appropriate command to each unit on the basis of each kind of information (steering angle, speed, inter-vehicle distance, brake, or the like) acquired from the image processing unit 2, the vehicle information acquisition unit 3, the light control unit 6, and the traveling system control unit 8.

The light switching unit 5 generates desired light mode information according to operation by the driver and transmits the light mode information to the light control unit 6.

The light control unit 6 is also referred to as an electronic control unit (ECU) for lamp control, and receives light mode information from the image processing unit 2 or the light switching unit 5. Furthermore, from the vehicle control unit 4, the light control unit 6 receives light mode information based on a control state such as a traveling state of the vehicle 100. The light control unit 6 sets an appropriate light mode for the lighting unit 7 on the basis of any of the light mode information.

The lighting unit 7 is headlights or small lights of the vehicle 100, and is set to a light mode corresponding to the light mode information input to the light control unit 6.

For example, the headlights are set to any one of low beam, high beam, or light-off, and the small lights are set to either light-on or light-off. It should be noted that the lighting unit 7 may use a halogen lamp or a plurality of light emitting diodes (LEDs), and in a case where LEDs are used, an irradiated region may be finely divided and the irradiated region may be specified in detail.

The traveling system control unit 8 is connected to an engine, a motor, a steering mechanism, a brake mechanism, or the like, which is not illustrated, transfers steering operation or acceleration/deceleration operation of the driver to the vehicle control unit 4, and operates the steering mechanism, the brake mechanism, or the like, according to a steering command or an acceleration/deceleration command from the vehicle control unit 4.

Figure 2:
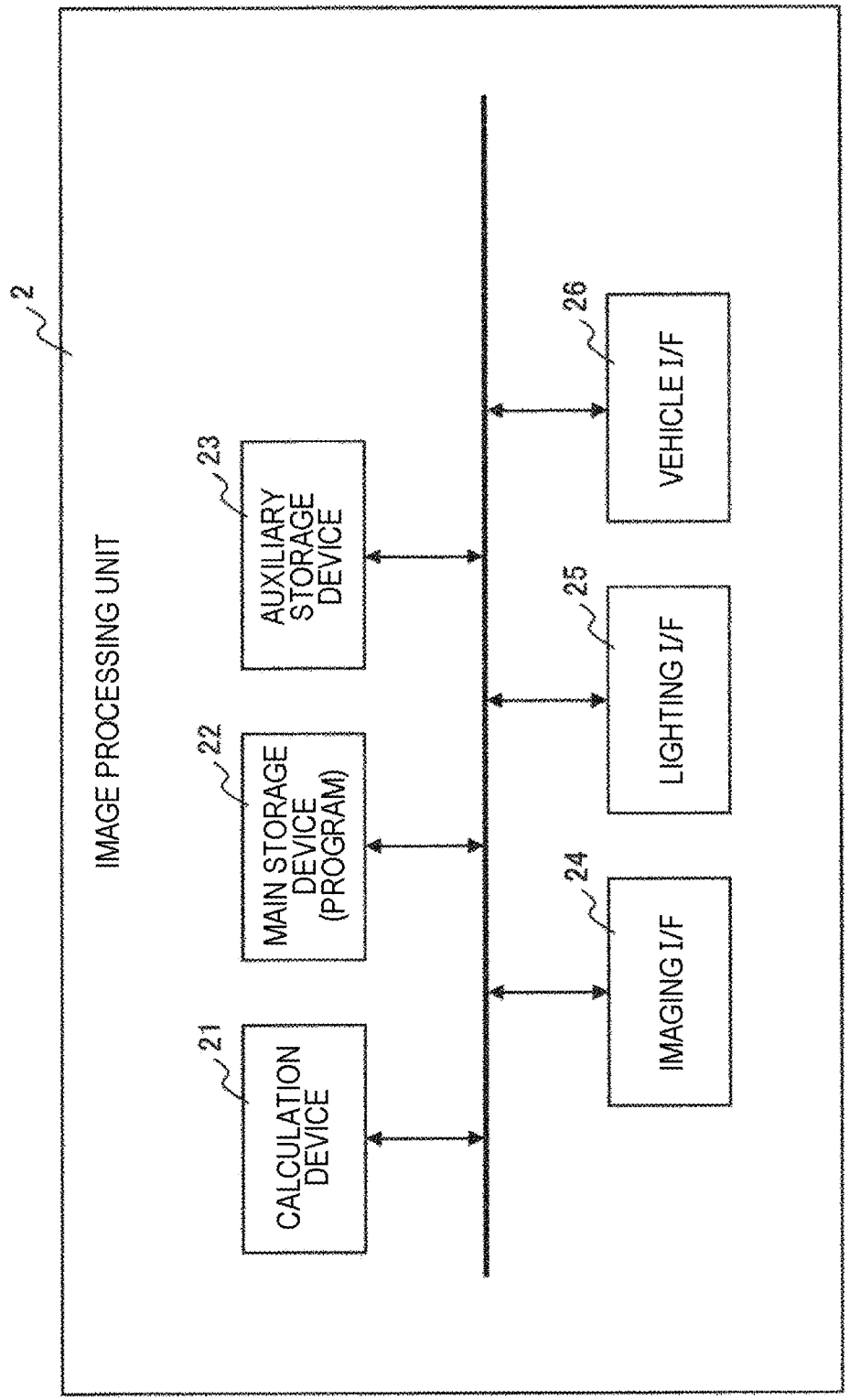
FIG. 2 is a block diagram of an image processing unit according to the first embodiment.

FIG. 2 is a functional block diagram of the image processing unit 2 described above. As illustrated here, the image processing unit 2 includes a calculation device 21, a main storage device 22 that stores a program, or the like, to be described later, an auxiliary storage device 23, an imaging interface (hereinafter, "imaging I/F 24") connected to the imaging unit 1, a lighting interface (hereinafter, "lighting I/F 25") connected to the light control unit 6, and a vehicle interface (hereinafter, "vehicle I/F 26") connected to the vehicle control unit 4, in which various functions described later are attained by the calculation device 21 executing, in the auxiliary storage device 23, a program read from the main storage device 22.

The image data 10 of an area in front of a vehicle imaged by the imaging unit 1 is stored in the auxiliary storage device 23 of the image processing unit 2 via the imaging I/F 24, and the calculation device 21 performs processing that a program specifies on the stored image data 10. As a result, the calculation device 21 generates light mode information corresponding to a recognition result of brightness of an area in front of the vehicle 100, and transmits the light mode information to the light control unit 6 via the lighting I/F 25. The light control unit 6 in FIG. 1, which has received the light mode information, controls the lighting unit 7 on the basis of the received information. In this way, in the automatic light system of the present embodiment, a light mode of the lighting unit 7 can be automatically switched according to image data 10 imaged by the imaging unit 1.

Next, processing content of the image processing unit 2 of the present embodiment will be described in detail by using FIGS. 3 to 15.

Figure 3:
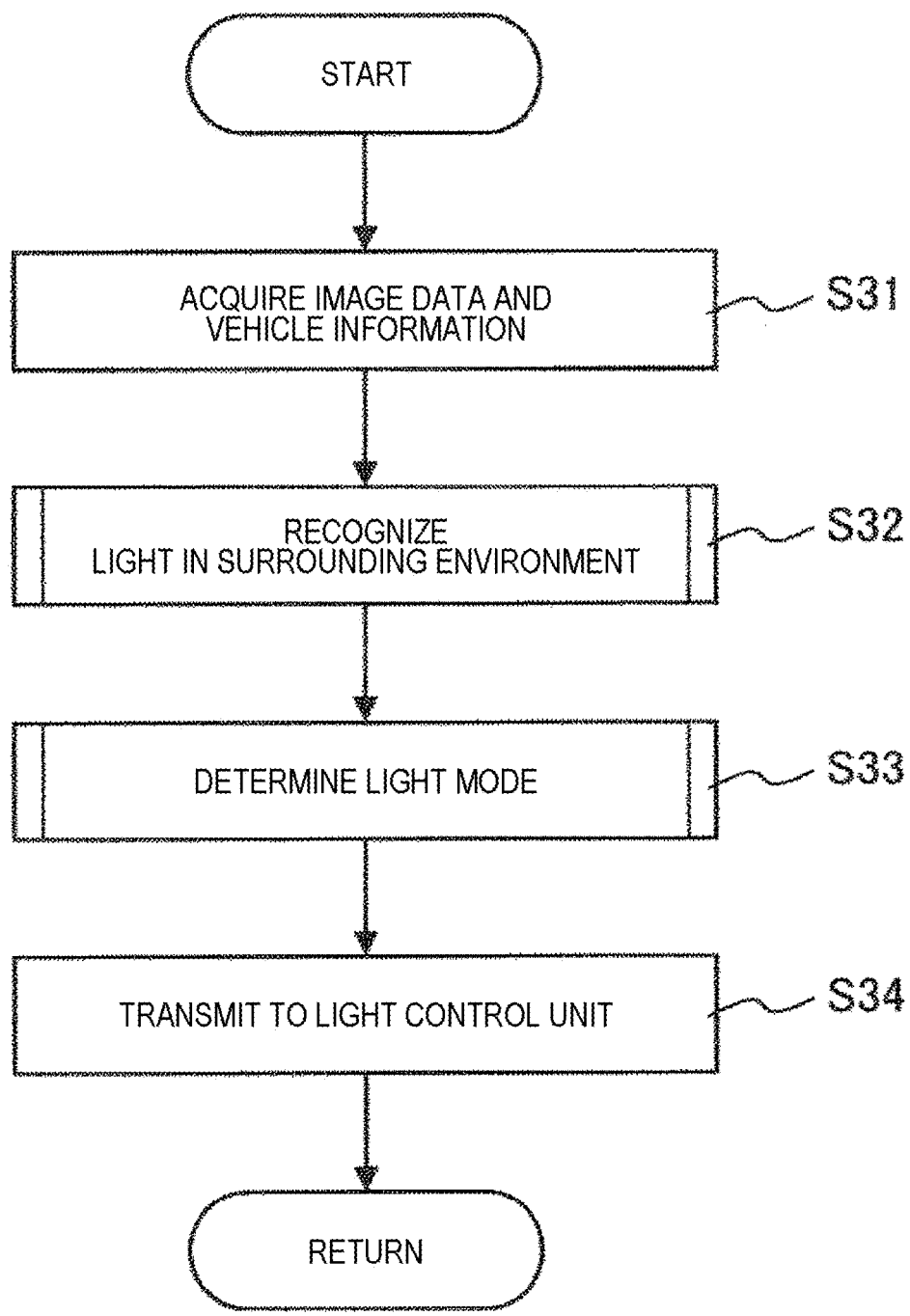
FIG. 3 is a flowchart illustrating an outline of automatic light control.

FIG. 3 is a flowchart illustrating an outline of processing in the image processing unit 2. As illustrated here, first, the image processing unit 2 acquires the image data 10 and vehicle information (S31), recognizes brightness of light in surrounding environment of the vehicle 100 from the image data 10 and the vehicle information (S32), determines a light mode corresponding to the brightness (S33), and then transmits corresponding light mode information to the light control unit 6 (S34). Hereinafter, each processing will be specifically described.

<Processing in S31 "Acquire Image Data and Vehicle Information">

In S31, the image processing unit 2 acquires the image data 10 from the imaging unit 1 via an imaging I/F 25, and acquires the vehicle information (speed, steering angle, or the like) from the vehicle information acquisition unit 3 via the vehicle control unit 4 and a vehicle I/F 27.

<Processing in S32 "Recognize Light in Surrounding Environment">

Subsequently, in S32, the image processing unit 2 uses the image data 10 and vehicle information acquired in S31 to recognize light in surrounding environment of an area in front of an own vehicle (S32). Recognition of light in surrounding environment here allows estimation of a luminance value on the basis of an exposure characteristic and an exposure value (luminance, shutter speed, or gain of an acquired image), and the luminance value is detectable as detected by a luminance meter.

The processing in S32 will be described in detail by using the flowchart in FIG. 4.

Figure 5:
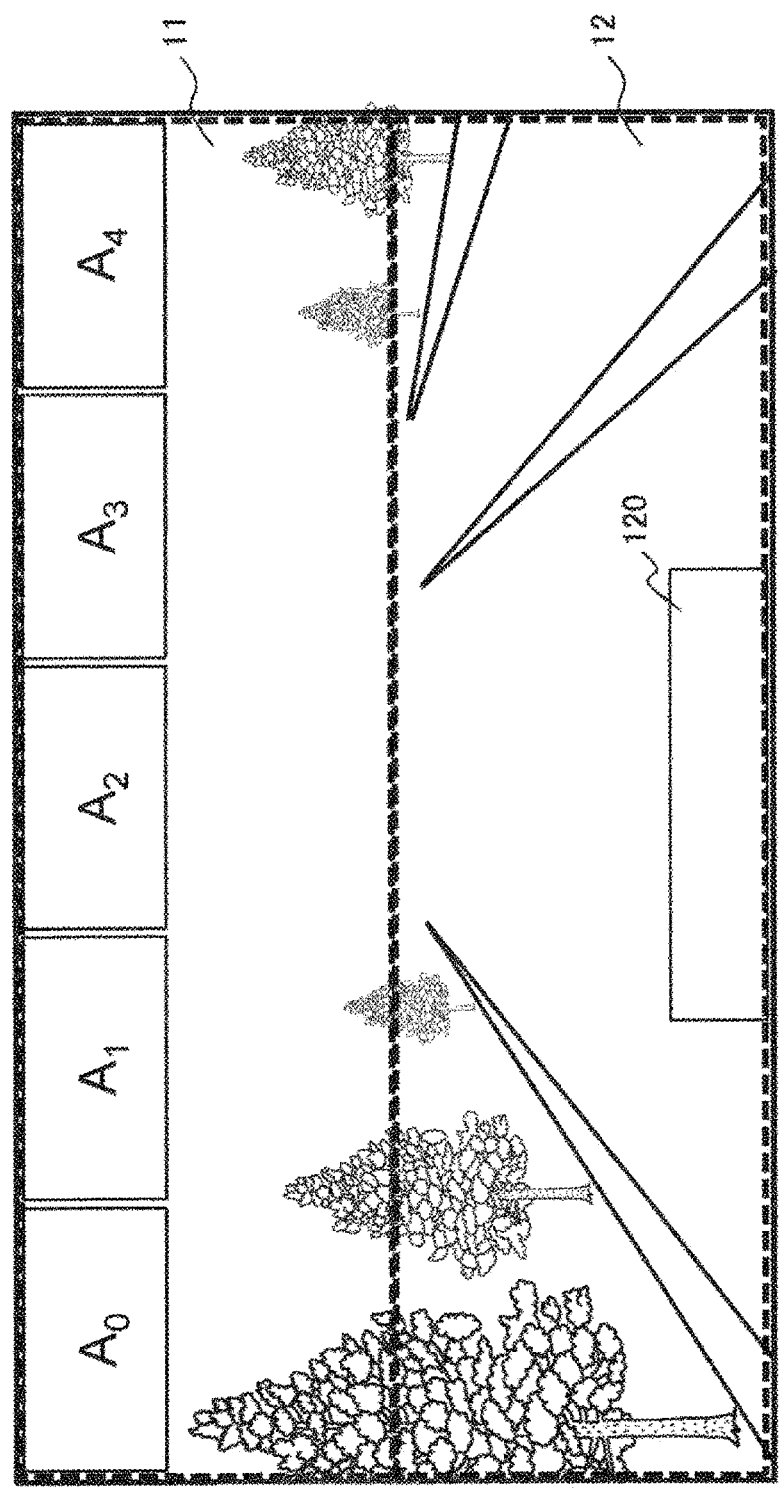
FIG. 5 is an example of an upper region and a lower region.

First, in S41, a judgment region is set to each of an upper part and lower part of the image data 10. FIG. 5 is an example of a judgment region set in the image data 10, and illustrates an example in which an upper region 11 that detects brightness mainly in a long distance and a lower region 12 that detects brightness mainly in a short distance are set. it should be noted that, although the image data 10 is equally divided into an upper half as the upper region 11 and a lower half as a lower region 12 in this example, a proportion of each may be changed as appropriate.

For the upper region 11, it is preferable to process so that not a surrounding tree, a signboard, a building, or the like, but only the sky is viewed, because the upper region 11 is a region for measuring light in surrounding environment in a long distance on the basis of brightness of the sky, or the like. Therefore, in the present embodiment, influence of a surrounding tree, a signboard, a building, or the like can be reduced, and only brightness of the sky in an area in front of a vehicle can be extracted by setting a plurality of upper measurement regions $A_0$ to $A_4$, which have a height of about one-fifth of a vertical size of an image, in an upper part of the upper region 11. However, accuracy in calculating the brightness of the sky may degrade in a case where a vertical size of each of the upper measurement regions is made too small (for example, one-tenth, one-twentieth), and therefore the height is set to about one-fifth of a vertical size of an entire image.

Meanwhile, for the lower region 12, it is preferable to process so that not a surrounding tree, a white line, or the like, but only a road in a short distance in a movement direction is viewed, because the lower region 12 is a region for measuring light in surrounding environment in a short distance on the basis of brightness, or the like, of a road surface in an area 3 to 5 m in front of the vehicle 100. Therefore, in the present embodiment, influence of a surrounding tree, a white line, or the like can be reduced, and only brightness of a road surface in an area in front of a vehicle can be extracted by setting a lower measurement region 120, which have a height of about one-seventh of a vertical size of an image and a width of about one-third of a horizontal size of the image, in a lower part of the lower region 12.

Subsequently, in S42, a steering angle θ is acquired from the vehicle information, and the movement direction of the vehicle 100 is judged. In S43, in consideration of the movement direction of the vehicle 100, a weight w in consideration of deviation from the movement direction is assigned to each of the upper measurement regions $A_0$ to $A_4$. In S44, calculation is performed by weighting environment light in the movement direction of the vehicle 100.

Figure 6:
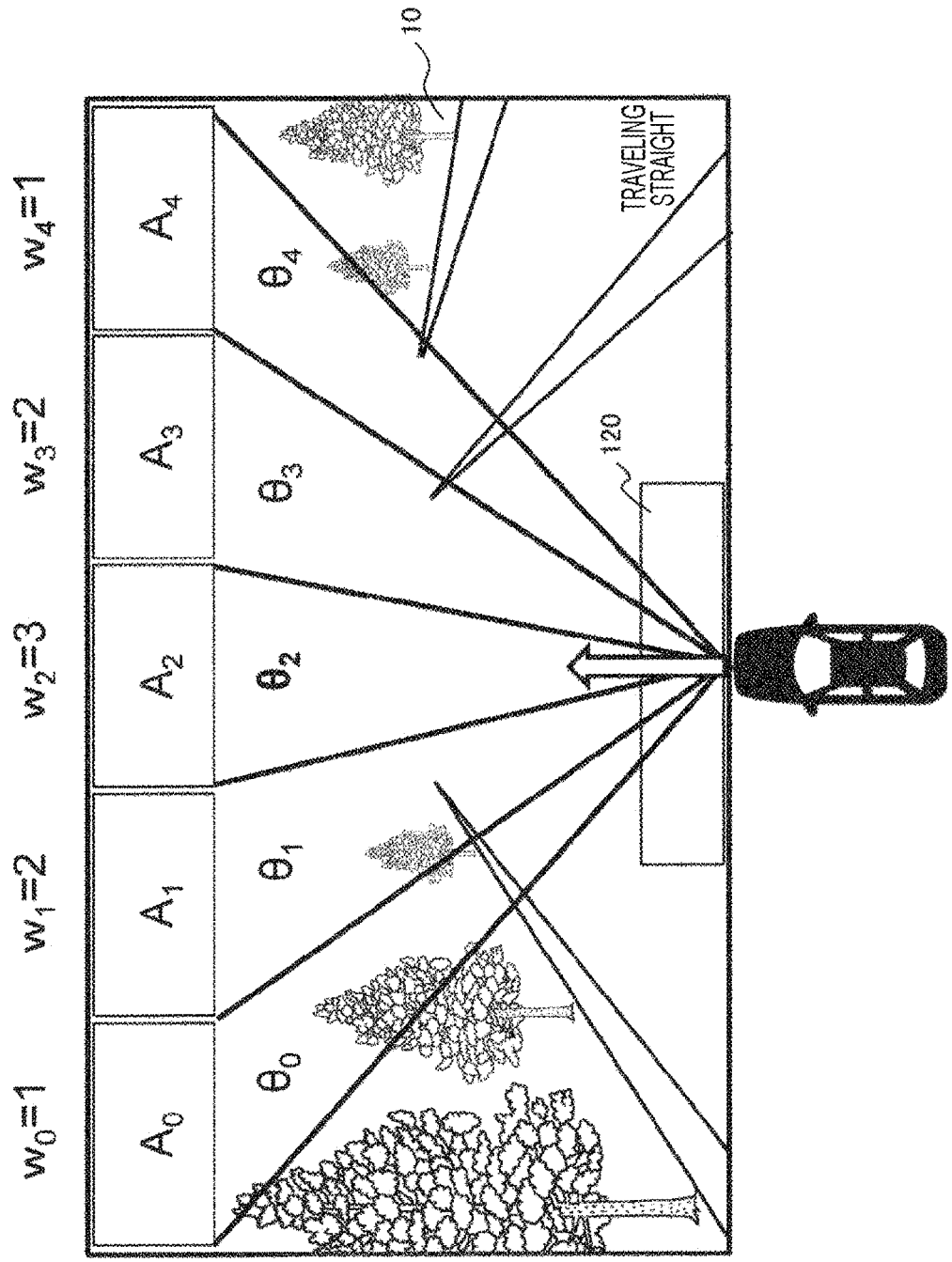
FIG. 6 is an example of weighting calculation for the upper measurement region based on a movement direction of an own vehicle.

Here, the processing in S42 and S43 will be specifically described by using FIGS. 6 and 7. A steering angle θ that the vehicle 100 may take can be classified into any one of steering angles $\theta_0$ to $\theta_4$, which are illustrated in FIG. 6, and each of which has a predetermined width. Because the upper measurement regions $A_0$ to $A_4$ set in the upper region 11 correspond to the steering angles $\theta_0$ to $\theta_4$ respectively, any upper measurement region corresponding to a current movement direction can be identified by acquiring a steering angle θ indicating the current movement direction from the vehicle information.

For example, as illustrated by an arrow in FIG. 6, in a case where the vehicle 100 is traveling substantially straight, the steering angle θ is included in the steering angle $\theta_2$, and therefore the upper measurement region $A_2$ can be identified as a region corresponding to the movement direction. Meanwhile, as illustrated in FIG. 7, in a case where the vehicle 100 is traveling on a sharp left curve, the steering angle θ is included in the steering angle $\theta_0$, and therefore the upper measurement region $A_0$ can be identified as a region corresponding to the movement direction.

When an upper measurement region corresponding to a movement direction of the vehicle 100 is identified, a weight in consideration of deviation from the movement direction is assigned to each of the upper measurement regions. This is to assign a maximum weight to a region corresponding to a movement direction and to assign a small weight to a region away from the movement direction. For example, in an example in FIG. 6, a weight w=3 is assigned to the upper measurement region $A_2$ that matches the movement direction, a weight w=2 is assigned to the upper measurement regions $A_1$ and $A_3$ that are adjacent to the upper measurement region $A_2$, and a weight w=1 is assigned to other regions. Furthermore, in the example of FIG. 7, the weight w=3 is assigned to the upper the weight w=2 is assigned to the adjacent upper measurement region $A_1$, and the weight w=1 is assigned to other regions.

Figure 4:
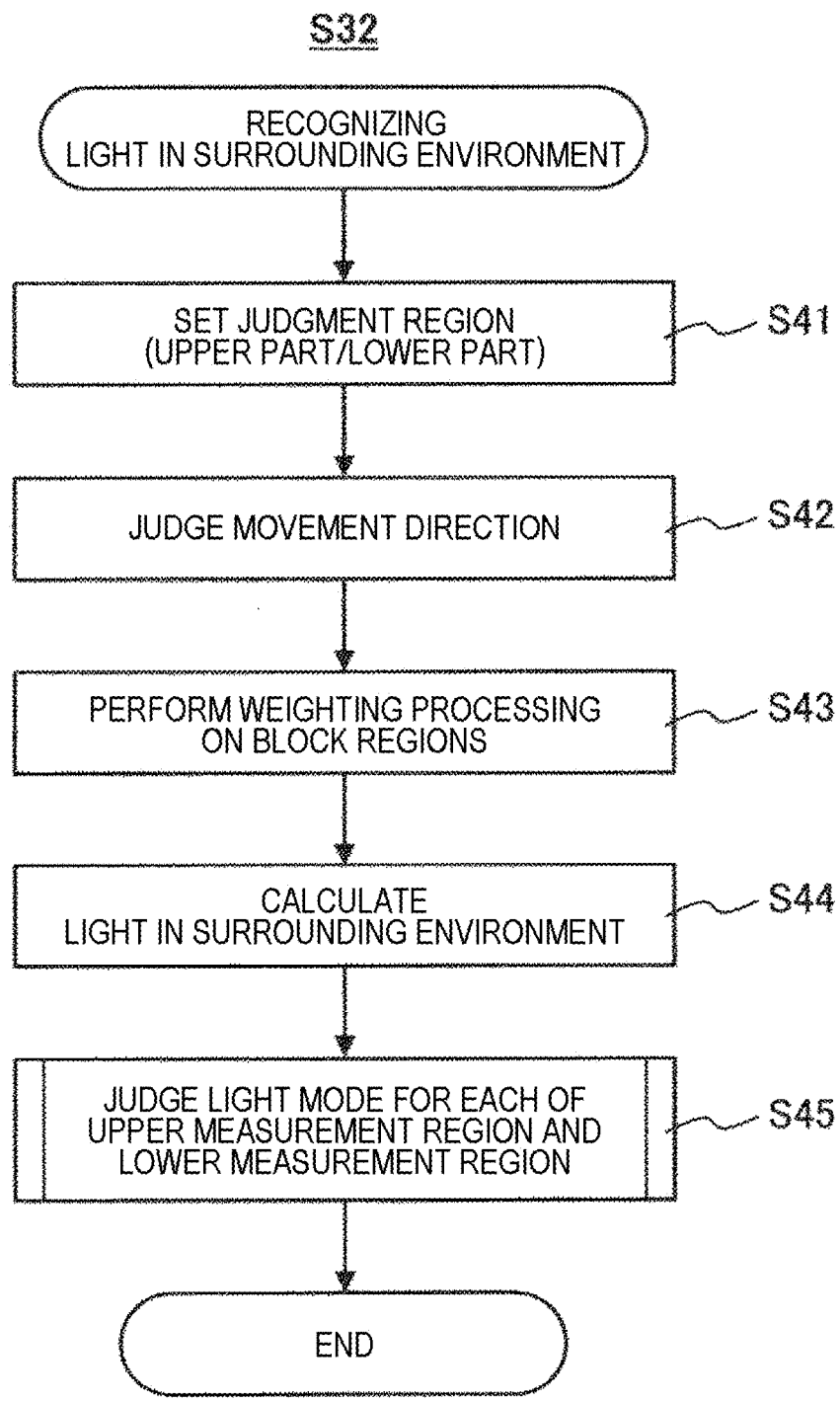
FIG. 4 is a flowchart related to recognition of light in surrounding environment.

In S44 in FIG. 4, light in surrounding environment in a long distance is calculated from brightness in the upper region 11 of the image data 10, and light in surrounding environment in a short distance is calculated from brightness in the lower region 12. it should be noted that, although brightness in each of the measurement regions can be calculated from luminance, shutter speed, or gain of the image data 10, the brightness may be obtained by using another method.

In a case where light in surrounding environment in a long distance is estimated in S44, first, a normal average value of the brightness in each of the upper measurement regions $A_0$ to $A_4$ is obtained, a darkest region is excluded, and then a weighted average value, which is to be brightness of light in surrounding environment in a long distance, is calculated. In this way, influence of noise can be eliminated by excluding data of the darkest region, accuracy in calculating light in surrounding environment in a long distance can be enhanced by obtaining a weighted average value in consideration of an amount of deviation from the movement direction.

Specific calculation of light in surrounding environment in a long distance in S44 is based on Formula 1.

[Formula 1]

$$\bar{x} = \frac{\sum_{i=1}^{n} x_i w_i m_i}{\sum_{i=1}^{n} w_i m_i} \quad \text{(Formula 1)}$$

In Formula 1, the left-hand side represents brightness of light in surrounding environment, and on the right-hand side, $x_i$ represents an average value of brightness of each of the measurement regions, $w_i$ represents a weight of each of the measurement regions, n represents the number of upper measurement regions, and $m_i$ represents a noise removal coefficient for excluding a darkest upper measurement region.

Furthermore, a weight $w_i$ in Formula 1 is defined by Formula 2, and a noise removal coefficient $m_i$ is defined by Formula 3.

[Formula 2]

$$w_i = \begin{cases} 3, & \text{Upper measurement region matching movement direction} \\ 2, & \text{Upper measurement region adjacent to movement direction} \\ 1, & \text{Another upper measurement region} \end{cases} \quad \text{(Formula 2)}$$

[Formula 3]

$$m_i = \begin{cases} 0, & \text{Darkest upper measurement region} \\ 1, & \text{Another upper measurement region} \end{cases} \quad \text{(Formula 3)}$$

Furthermore, as the example in FIG. 7 of traveling on a sharp curve, in a case where a weight w=1 is assigned to three of five upper measurement regions, or in a case where a weight w=2 is assigned to only one of the five upper measurement regions, light in surrounding environment may be calculated by ignoring a depth component of the image data 10 and also by considering the lower measurement region 120 corresponding to light in surrounding environment in a short distance. With this arrangement, even when the vehicle 100 is traveling on a sharp curve, overevaluation of an upper measurement region corresponding to a movement direction can be avoided, and light in surrounding environment can be estimated appropriately.

It should be noted that, although an example in which the number of the upper measurement regions is set to five is described in FIGS. 5 to 7, the number of the upper measurement regions to be set may be increased or decreased according to accuracy required for detecting light in surrounding environment. For example, in a case where the number of upper measurement regions is three, a weight w may be a binary of "1" and "2", and the weight w of each region may be assigned according to Formula 4.

[Formula 4]

$$w_i = \begin{cases} 2, & \text{Upper measurement region matching movement direction} \\ 1, & \text{Another upper measurement region} \end{cases} \quad \text{(Formula 4)}$$

Meanwhile, in a case where light in surrounding environment in a short distance is estimated on the basis of the lower region 12 of the image data 10 in S44, the brightness is calculated by a luminance average value of the lower measurement region 120.

After brightness of the light in surrounding environment is calculated for each region in the upper part and the lower part in S44, a light mode corresponding to the brightness of the light in surrounding environment of each is individually judged in S45.

Figure 8A:
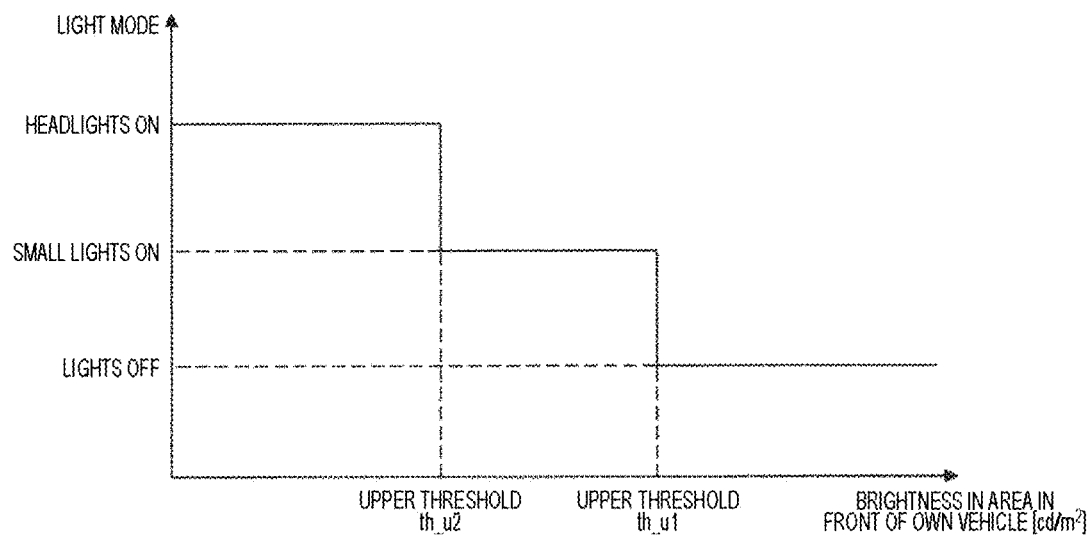
FIG. 8A is a relation diagram of brightness in an area in front of the own vehicle and each light mode.

Here, FIG. 8A is a schematic diagram illustrating a relation between brightness [cd/m$^2$] in the upper region 11 and a light mode, and is illustrating that "lights OFF" is selected when the brightness exceeds an upper threshold th_u1, "small lights ON" is selected when the brightness is between the upper threshold th_u1 and an upper threshold th_u2, and "headlights ON" is selected when the brightness is less than the upper threshold th_u2.

Figure 8B:
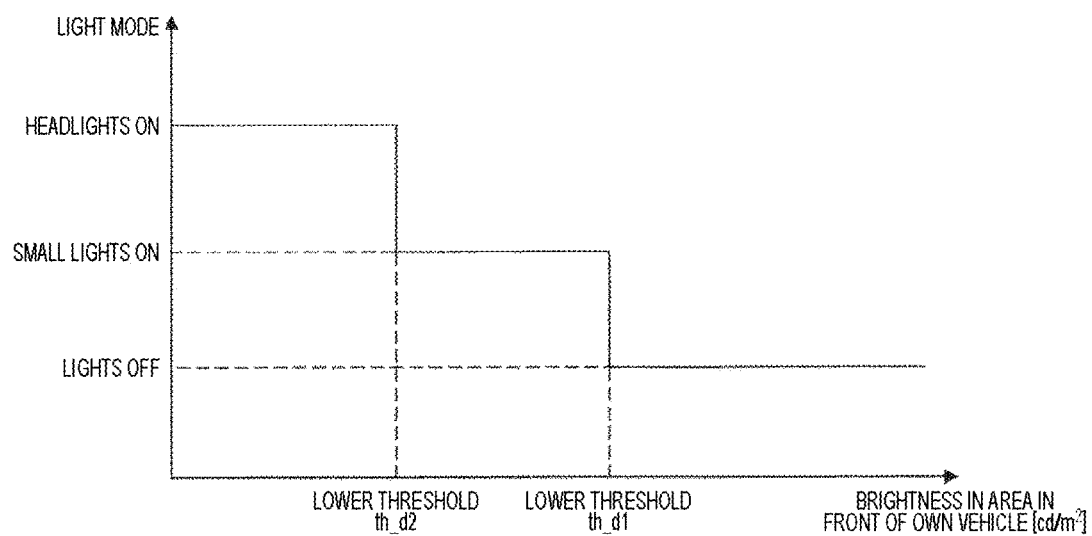
FIG. 8B is a relation diagram of brightness in the area in front of the own vehicle and each light mode.

Similarly, FIG. 8B is a schematic diagram illustrating a relation between brightness [cd/m$^2$] in the lower region 12 and a light mode, and is illustrating that "lights OFF" is selected when the brightness exceeds a lower threshold th_d1, "small lights ON" is selected when the brightness is between the lower threshold th_d1 and a lower threshold th_d2, and "headlights ON" is selected when the brightness is less than the lower threshold th_d2.

That is, in both cases of FIG. 8A and FIG. 8B, "lights OFF" is selected if surrounding environment is bright, "headlights ON" is selected if the surrounding environment is dark, and "small lights ON" is selected for an intermediate. It should be noted that the upper and lower thresholds do not need to be the same value, and in the present embodiment, the upper threshold th_u1 and the upper threshold th_u2 are set to 150 [cd/m$^2$] and 70 [cd/m$^2$] respectively in FIG. 8A, and the lower threshold th_d1 and the lower threshold th_d2 are set to 100 [cd/m$^2$] and 40 [cd/m$^2$] in FIG. 8B, in consideration of a lens, shutter speed, gain, or the like, of the imaging unit 1.

Figure 9:
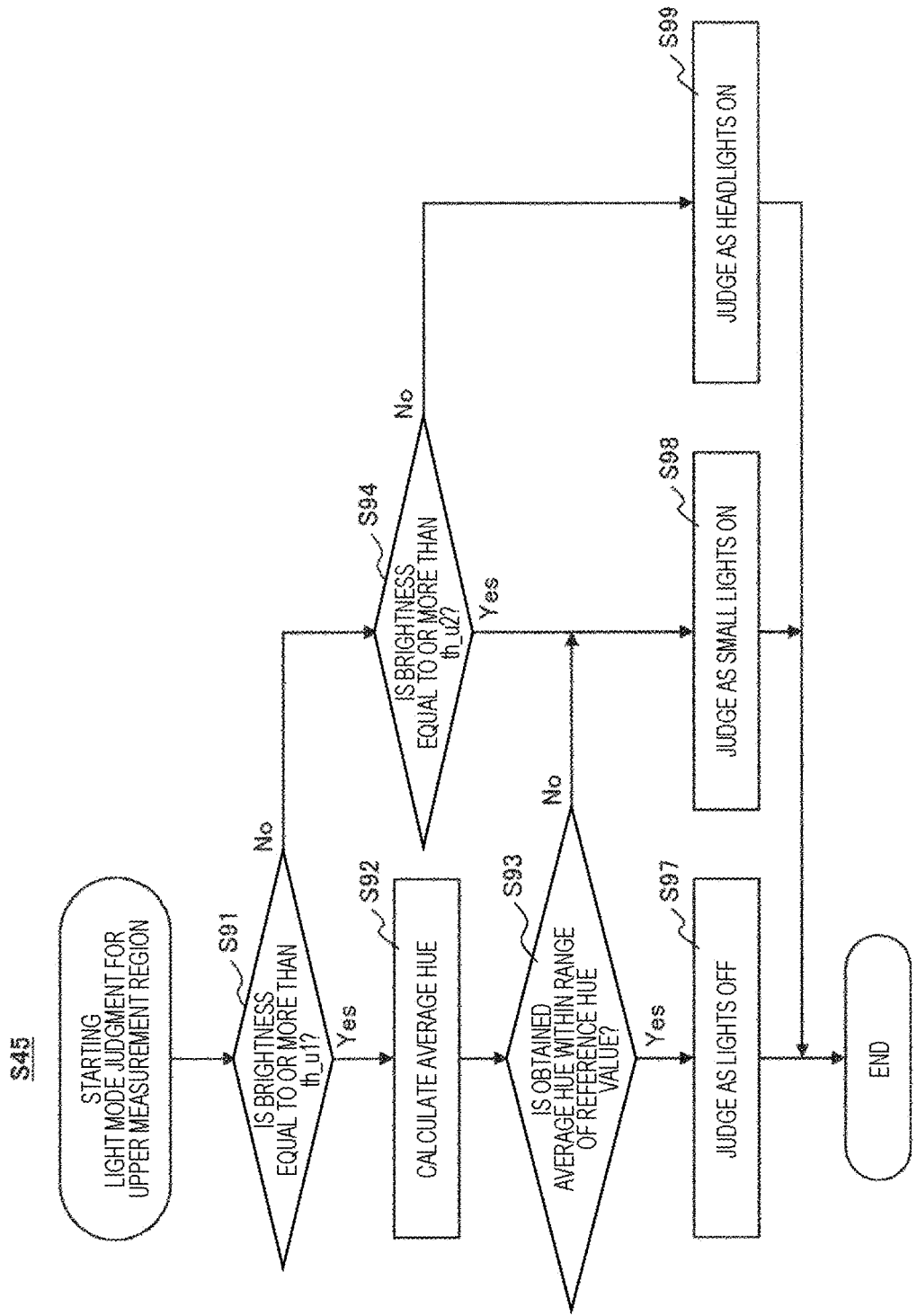
FIG. 9 is a flowchart illustrating light mode judgment based on the upper measurement region.
Figure 10:
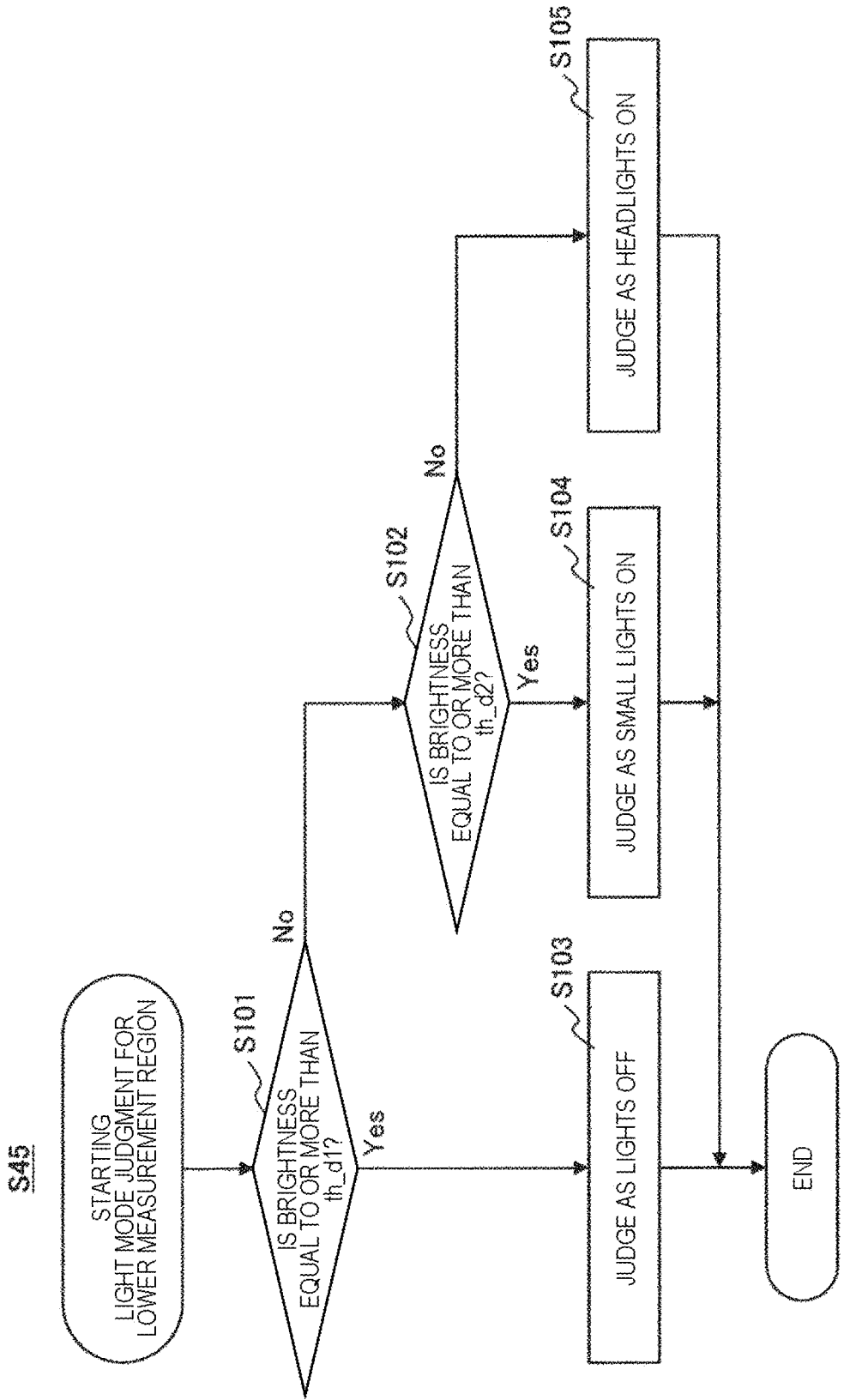
FIG. 10 is a flowchart illustrating light mode judgment based on a lower measurement region.

Furthermore, a method other than the methods in FIGS. 8A and 8B may be adopted for light mode judgment for the upper region 11 and the lower region 12 executed in S45. FIG. 9 is a flowchart illustrating another method for light mode judgment for the upper region 11, and FIG. 10 is a flowchart illustrating another method for light mode judgment for the lower region 12.

FIG. 9 is a flowchart for judging a light mode on the basis of light in surrounding environment, the light being obtained in the upper region 11. First, in S91, it is judged whether brightness of the light in surrounding environment is equal to or more than an upper threshold th_u1, and if this is satisfied, average hue of the upper measurement regions $A_0$ to $A_4$ is calculated in S92. In calculation of the average hue, not a hue average for the number of all pixels in the upper measurement regions $A_0$ to $A_4$, but only hue of an image region including the sky is calculated. That is, the average hue is obtained by excluding the number of saturated pixels (R=max, G=255, B=255) in the upper measurement regions $A_0$ to $A_4$.

After that, whether the obtained average hue is within a predetermined hue range (180<H<270) is judged in S93, and if this is satisfied, the light in surrounding environment is judged to be blue, that is, estimated to be daytime and fine weather, and the light mode is set to "lights OFF" (S97). Furthermore, in a case where a condition in S93 is not satisfied, the light in surrounding environment is judged to be red or orange, that is, estimated to be early evening, and the light mode is set to "small lights ON" (S98).

Furthermore, whether brightness of the light in surrounding environment is less than the upper threshold th_u1 and equal to or more than the upper threshold th_u2 is judged in S94, and if this is satisfied, the light in surrounding environment is judged to be dim, that is, estimated to be rainy weather, and the light mode is set to "small lights ON" (S98). In a case where a condition in S94 is not satisfied, the light in surrounding environment is judged to be little, that is, estimated to be night time, and the light mode is set to "headlights ON" (S99).

Meanwhile, FIG. 10 is a flowchart for judging a light mode on the basis of light in surrounding environment, the light being obtained in the lower region 12. First, in S101, it is judged whether brightness of the light in surrounding environment is equal to or more than the lower threshold th_d1, and if this is satisfied, the light mode is set to "lights OFF" (S103). Furthermore, in a case where a condition in S101 is not satisfied, whether brightness of the light in surrounding environment is less than the lower threshold th_d1 and equal to or more than the lower threshold th_d2 is judged in S102, and if this is satisfied, the light mode is set to "small lights ON" (S104). In a case where a condition in S102 is not satisfied, the light mode is set to "headlights ON" (S105).

When a light mode is judged for each of the upper region 11 and the lower region 12 by any one of the methods determined above, and processing in S45 is completed, all the processing in S32 in FIG. 3 is completed, and the processing proceeds to S33 "Determine light mode".

<Processing in S33 "Determine Light Mode"

Figure 11:
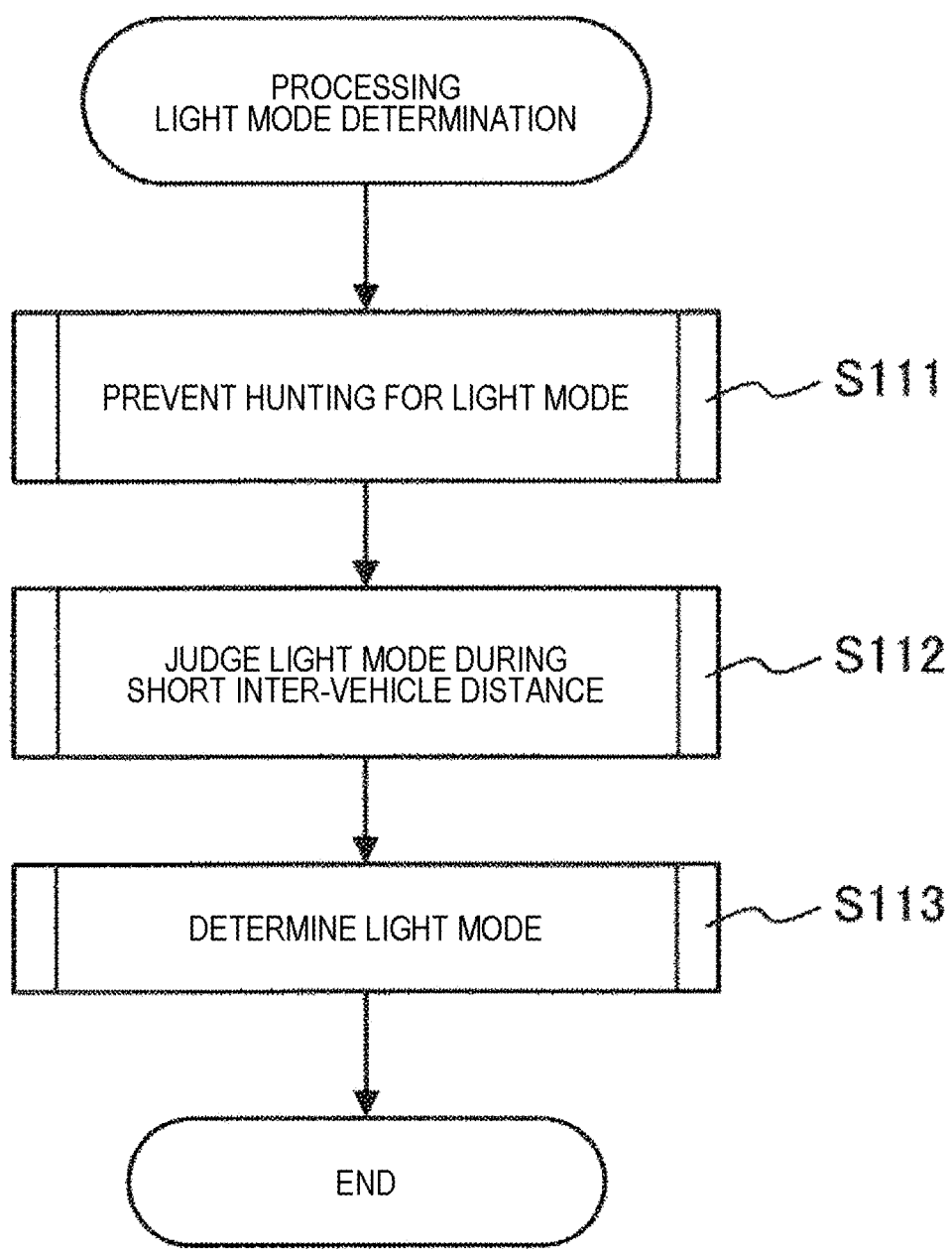
FIG. 11 is a flowchart illustrating light mode determination.

FIG. 11 is a flowchart illustrating a detail of processing in S33 "Determine light mode" in FIG. 3. Here, taking into account light modes based on each of the upper region 11 and the lower region 12 obtained in S32, a light mode to be actually set for the lighting unit 7 is determined.

First, in S111 "Prevent hunting for light mode", processing to prevent hunting (a phenomenon in which a light mode switches in succession in a short period of time) for a light mode is performed in consideration of vehicle speed of the vehicle 100.

Figure 12:
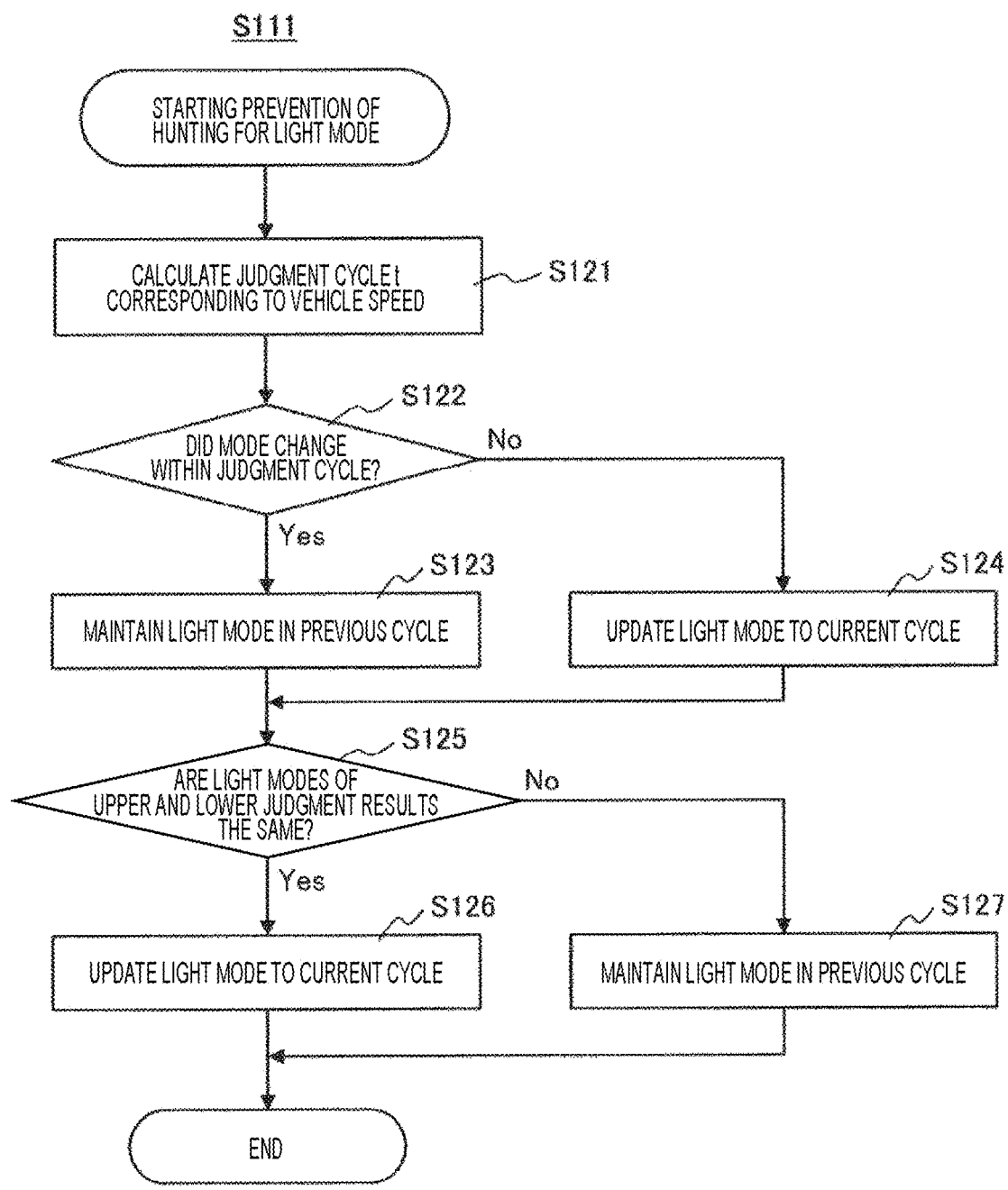
FIG. 12 is a flowchart illustrating hunting prevention processing for each region.
Figure 13:
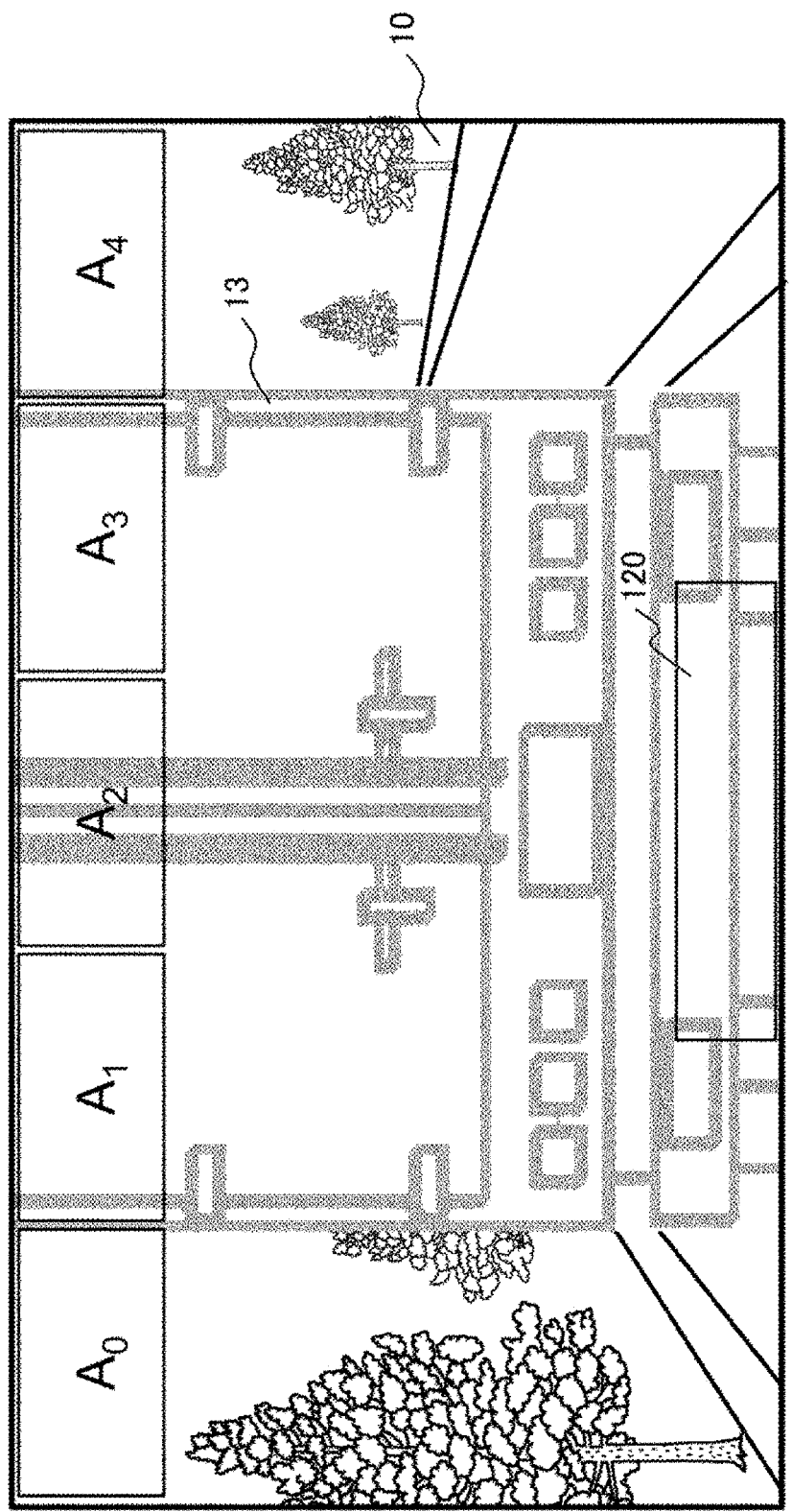
FIG. 13 is an example of weighting calculation for an upper determination region for when approaching a preceding vehicle.

FIG. 12 is a flowchart illustrating a detail of processing in S111 "Prevent hunting for light mode" in FIG. 11, and a failure in which a light mode of the lighting unit 7 switches in succession in a short period of time is avoided by performing hunting prevention processing for the light modes of the upper and lower regions according to the flowchart.

As described above, the safety standards revised in October 2016 requires automatic lighting within 2 seconds in a case where surrounding illuminance is less than 1000 [lx], and therefore, there is no problem even if a lighting necessity judgment cycle is fixed to 2 seconds. However, in a case where the judgment cycle is fixed at 2 seconds, a problem regarding safety or sense of the driver may arise in that, for example, even if a vehicle enters a tunnel when traveling on a highway, headlights do not turn on until the vehicle travels a considerable distance.

Therefore, in the present embodiment, the judgment cycle is shortened during high-speed traveling to accelerate a response of the lighting unit 7 so that the driver does not feel unnatural.

In order to attain this, a judgment cycle t, which is substantially inversely proportional to speed of the vehicle 100, is calculated in S121 in FIG. 12. it should be noted that the judgment cycle t calculated here becomes shorter as vehicle speed increases, and approaches 2 seconds as the vehicle speed decreases, and is calculated with, for example, Formula 5.

[Formula 5]

$$t = T \cdot e^{-\alpha(s/120)^2} \qquad \text{(Formula 5)}$$

Here, on the right-hand side, s represents vehicle speed [m/sec.], T represents 2 [sec.], and a represents a variable for adjusting a shortest cycle, and t on the left-hand side represents a judgment cycle to be set.

If a judgment cycle t corresponding to speed is calculated in S121, whether a light mode has changed in the upper and lower regions within the judgment cycle t is determined in S122. Then, in a case where a light mode has changed, it is determined that judgment in the region is unstable, and a light mode in a previous judgment cycle is maintained (S123). Meanwhile, in a case where the light mode does not change within the judgment cycle t, it is determined that the judgment in the region is stable, and the light mode is updated to a current judgment cycle (S124). It should be noted that, because determination in S122 is performed independently for each of the upper and lower regions, one region may maintain a light mode in a previous cycle and a light mode of another region may be updated to a current cycle.

Next, in S125, the light modes of the upper and lower regions after the processing in S122 to S124 are compared to determine whether the both are the same. If the both are the same, the light mode is set as an output in S111 (S126). Meanwhile, if the both are different, the light mode in the previous judgment cycle is set as the output of S111 (S127).

Next, in S112 "Judge light mode during short inter-vehicle distance" in FIG. 11, a light mode is judged by using a threshold (upper thresholds th_u1, th_u2 in FIG. 8A, or the like) that takes into account the inter-vehicle distance to the preceding vehicle.

In general, there is a relation between speed of the vehicle 100 and an inter-vehicle distance. If the speed is high, the inter-vehicle distance tends to be long, and if the speed is low, the inter-vehicle distance tends to be short. In a situation where there is no preceding vehicle and speed is high as illustrated in FIG. 5, light in surrounding environment can be accurately detected in any of the upper measurement regions $A_0$ to $A_4$ and the lower measurement region 120. However, in a situation where the inter-vehicle distance to a preceding vehicle is short as in FIG. 13, most of the image data 10 imaged by the imaging unit 1 is occupied by a preceding vehicle 13, and it is difficult to accurately detect original light in surrounding environment. For this reason, there is a possibility that the light mode is set to "headlights ON" during traffic congestion even during fine weather. Therefore, in S112, a threshold for judgment of a light mode is adjusted in consideration of an inter-vehicle distance so that an appropriate light mode can be set regardless of length of the inter-vehicle distance.

Figure 14:
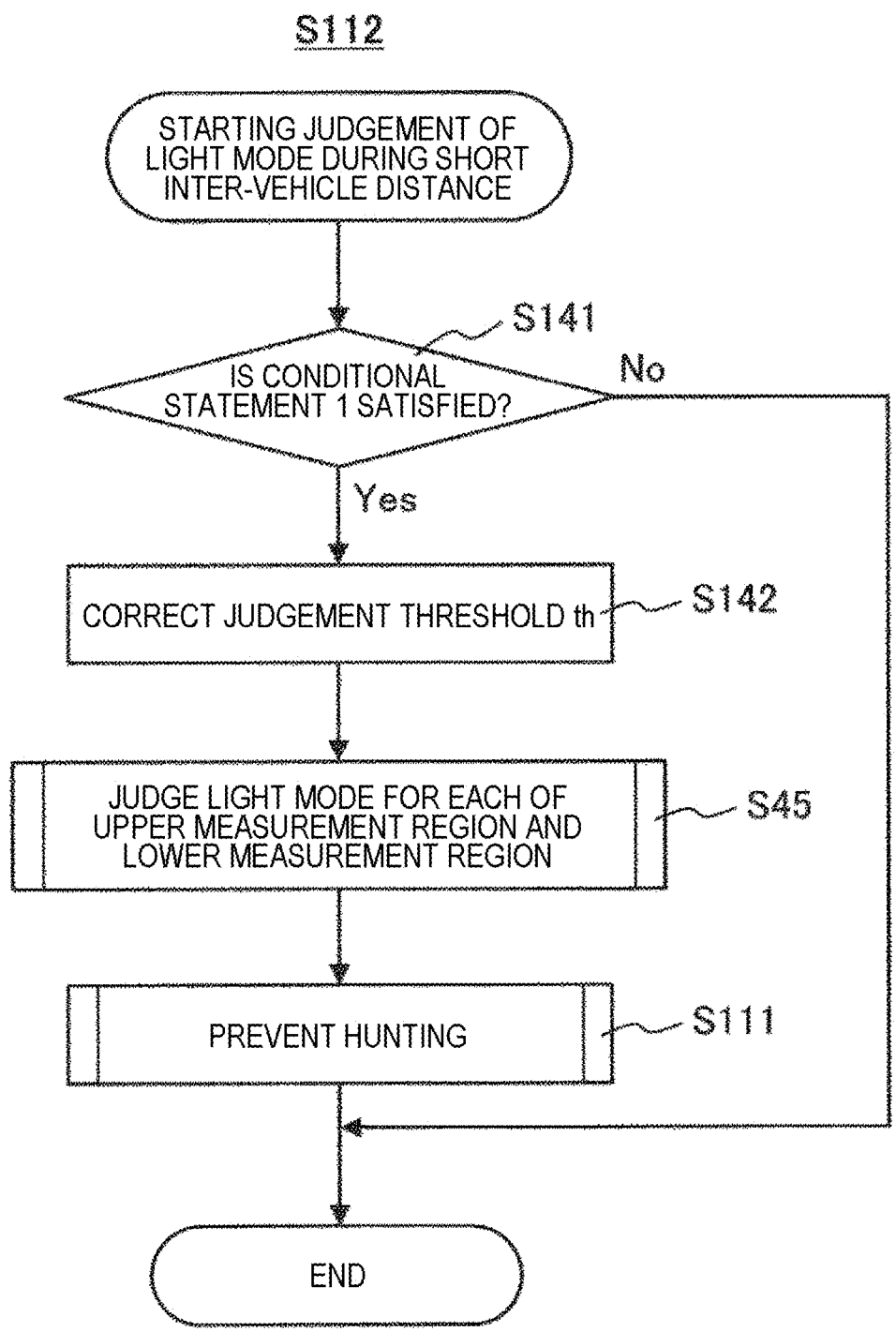
FIG. 14 is a flowchart illustrating judgment processing for when traveling at a low speed.

FIG. 14 is a flowchart illustrating detailed processing in S112 "Judge light mode during short inter-vehicle distance". First, in S141, it is judged whether or not a conditional statement 1 is satisfied. The conditional statement 1 is a conditional statement for avoiding lights from erroneously being turned on during traffic congestion, and therefore content of the conditional statement 1 is defined by the following two parts.

Conditional statement 1a: Vehicle speed is in a state of stop, low speed, or deceleration.

Conditional statement 1b: A current light mode is "lights OFF".

In a case where the conditional statement 1 is not satisfied, it is estimated that a proportion of the preceding vehicle 13 that occupies the image data 10 is small, and light in surrounding environment can be accurately detected from the upper and lower regions, or that the surrounding environment is dark and the lighting unit 7 is already on, and therefore, the processing in S112 is not performed. Meanwhile, in a case where the conditional statement 1 is satisfied, there is a possibility that a proportion of the preceding vehicle 13 that occupies the image data 10 is large due to traffic congestion, and therefore a threshold for judgment of a light mode is corrected so as not to erroneously turn on the lighting unit 7 (S142).

When correcting a judgment threshold in S142, speed of the vehicle 100 and the number of low-luminance pixels in the image data 10 are considered. The number of low-luminance pixels described here is the number of low-luminance pixels included in the upper measurement regions $A_0$ to $A_4$, the low-luminance pixels having a pixel value of (8 bits) or less. A reason for correcting the judgment threshold in consideration of the number of low-luminance pixels is that light mode judgment is not adversely influenced even if the vehicle 100 goes close to the preceding vehicle 13 due to traffic congestion, or the like, in a case where vehicle body color of the preceding vehicle is white or bright color having a high reflectance, while suitability of light mode judgment is greatly influenced by an inter-vehicle distance in a case where the vehicle body color of the preceding vehicle 13 is black or dark color having a low reflectance. For this reason, an inter-vehicle distance to the preceding vehicle 13 in black or dark color is estimated from the number of low-luminance pixels in the upper measurement regions $A_0$ to $A_4$, and the upper thresholds th_u1 and th_u2 are corrected according to a predicted inter-vehicle distance (S142). A correction formula for the judgment threshold used here is as shown in Formula 6.

[Formula 6]

$$\text{th\_new} = th - R \cdot \left(1 - \frac{s}{18}\right) \cdot \left(1 - e^{-\alpha(D/100)^2}\right) \quad \text{(Formula 6)}$$

Here, th_new represents a corrected judgment threshold, th represents an initial judgment threshold, s represents vehicle speed, R represents a threshold adjustment range, D represents the number of low-luminance pixels in the upper measurement regions $A_0$ to $A_4$, and a represents an adjustment variable.

If the judgment threshold th is corrected in S142, a light mode for the upper region 11 is judged by a method similar to S45 in FIG. 9, and then hunting prevention processing for the light mode is performed by a method similar to S111 in FIG. 12. In this way, by correcting a threshold used for judgment of a light mode in consideration of the vehicle body color of the preceding vehicle 13 and the inter-vehicle distance to the preceding vehicle 13, it is possible to avoid erroneous operation such as erroneously turning on headlights even in a situation where the vehicle 100 stops immediately behind the preceding vehicle 13 in black during traffic congestion.

Next, in S113 "Determine light mode" in FIG. 11, a light mode to be set for the lighting unit 7 is finally determined on the basis of the light modes output from the processing in S111 and S112.

Figure 15:
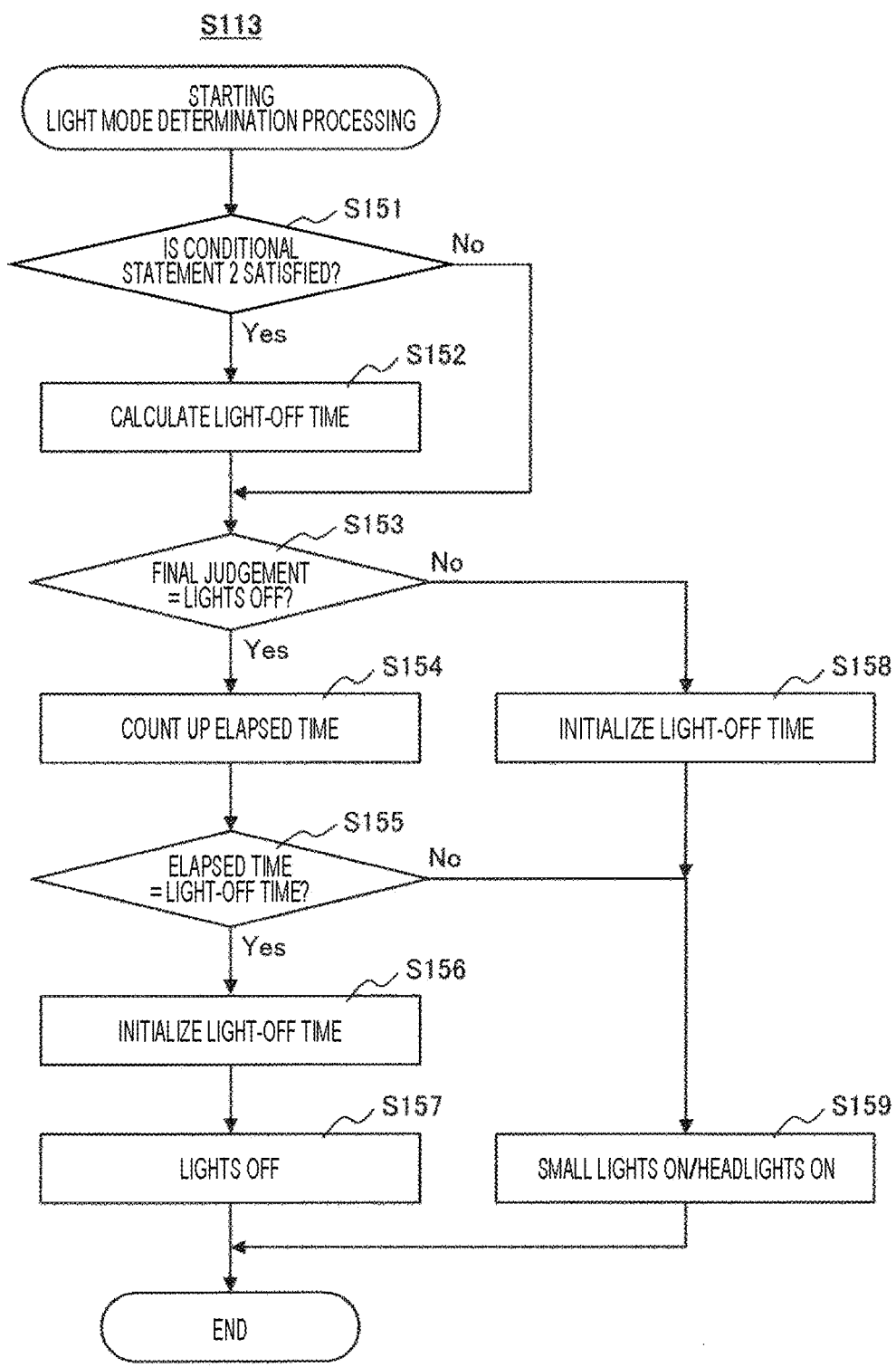
FIG. 15 is a flowchart illustrating light-off time control.

FIG. 15 is a flowchart illustrating detailed processing in S113 "Determine light mode". As illustrated here, in S151, it is judged whether a conditional statement is satisfied. The conditional statement 2 is a conditional statement for determination of whether it is necessary to turn off the lighting unit 7, and is defined by the following two statements.

Conditional statement 2a: Previous final judgment is "small lights ON" or "headlights ON".

Conditional statement 2b: Current final judgment is "lights OFF".

Because it is time to switch the lighting unit 7 from light-on to light-off when both the conditional statements are satisfied, time required to turn off the lighting unit 7 is calculated corresponding to the vehicle speed (S152). Although light-off time calculated here can be calculated by using Formula 5 as in calculating light-on time, any value between 5 and 300 seconds is set for an initial value T of the light-off time, in consideration of automatic light-off time stipulated by the safety standards.

After the processing in S152, or when the conditional statement 2 is not satisfied (maintaining light-off, maintaining light-on, or light-off to light-on), it is judged whether current final judgment is "lights OFF" (S153). In a case where the final judgment is "lights OFF", an elapsed time is counted up (S154), and when the elapsed time matches the light-off time set in S152 (S155), the light-off time is initialized (S156), and "lights OFF" is output (S157). With this arrangement, light-on can be maintained for the lighting unit 7 before a predetermined time elapses, and the lighting unit 7 can be turned off after the predetermined time elapses.

Meanwhile, in a case where the judgment in S153 is No, that is, in a case where the final judgment is either "small lights ON" or "headlights ON", it is not necessary to turn off the lights for a while. Therefore, even in a case where light-off time has been set in S152, the light-off time is initialized (S158), and either "small lights ON" or "headlights ON" is output (S159).

When a light mode is determined after a series of processing (S113) in FIG. 15 ends, a series of processing (S33) in FIG. 11 also ends, and the processing proceeds to S34 in FIG. 3.

<Processing in S34 "Transmit to Light Control Unit">

In the processing S34 "Transmit to light control unit" in FIG. 3, light mode information of any one of "lights OFF", "small lights ON", or "headlights ON", which is an output result of the processing in S33 "Determine light mode", is forwarded to the light control unit 6, and the light control unit 6 accordingly turns on or off the lighting unit 7.

According to the above-described automatic light system of the present embodiment, brightness of light in surrounding environment can be accurately evaluated even in a case of traveling on a sharp curve or a short inter-vehicle distance to a preceding vehicle, for which the brightness of the light in surrounding environment cannot be accurately evaluated with a conventional method. Therefore, appropriate automatic light control that a driver does not feel unnatural can be attained.

it should be noted that, although an example in which brightness of light in surrounding environment is measured by using the imaging unit 1 that images an area in front is described in the present embodiment, a rear camera of the vehicle 100 may be used to measure brightness of the light in surrounding environment and generate light mode information.

Second Embodiment

Next, an automatic light system according to a second embodiment of the present invention will be described. Although a monocular camera is used as an imaging unit 1 in the first embodiment, the present embodiment is different from the first embodiment in that a stereo camera is used as an imaging unit 1, an inter-vehicle distance to a preceding vehicle is accurately measured by using the stereo camera, and a light mode is determined on the basis of the measured inter-vehicle distance. It should be noted that duplicate description will be omitted for a point in common with the first embodiment.

Figure 16:
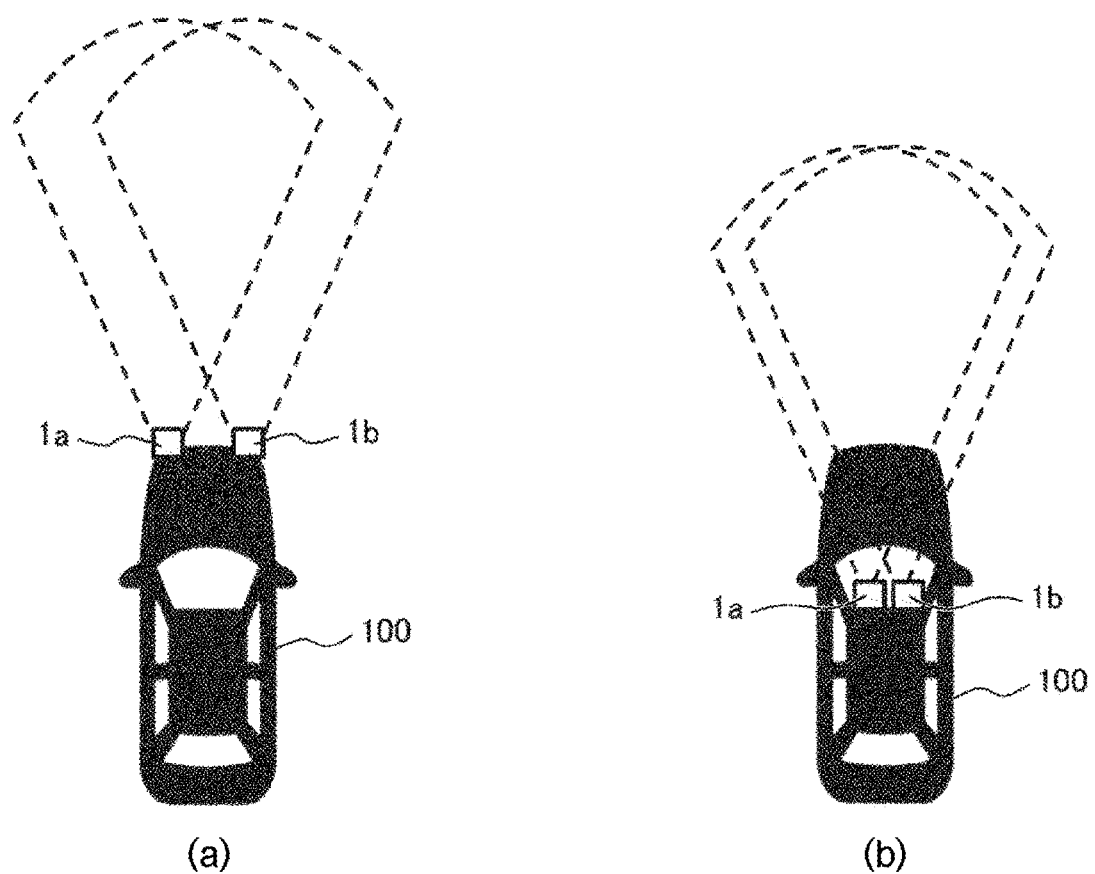
FIG. 16 is a configuration diagram of a camera device according to a second embodiment.

As illustrated in FIGS. 16(*a*) and (*b*), a vehicle 100 of the present embodiment includes two cameras 1*a* and 1*b* (hereinafter referred to as a "stereo camera") including an identical optical system. FIG. 16(*a*) is an example in which a stereo camera is built in a lighting unit 7 of the vehicle 100, and FIG. 16(*b*) is an example in which a stereo camera is attached to an indoor ceiling part of the vehicle 100. With any of these configurations, information of the measured distance can be recorded by taking an image of an area in front from a plurality of different directions at the same time in the vehicle 100 of the present embodiment.

Figure 17:
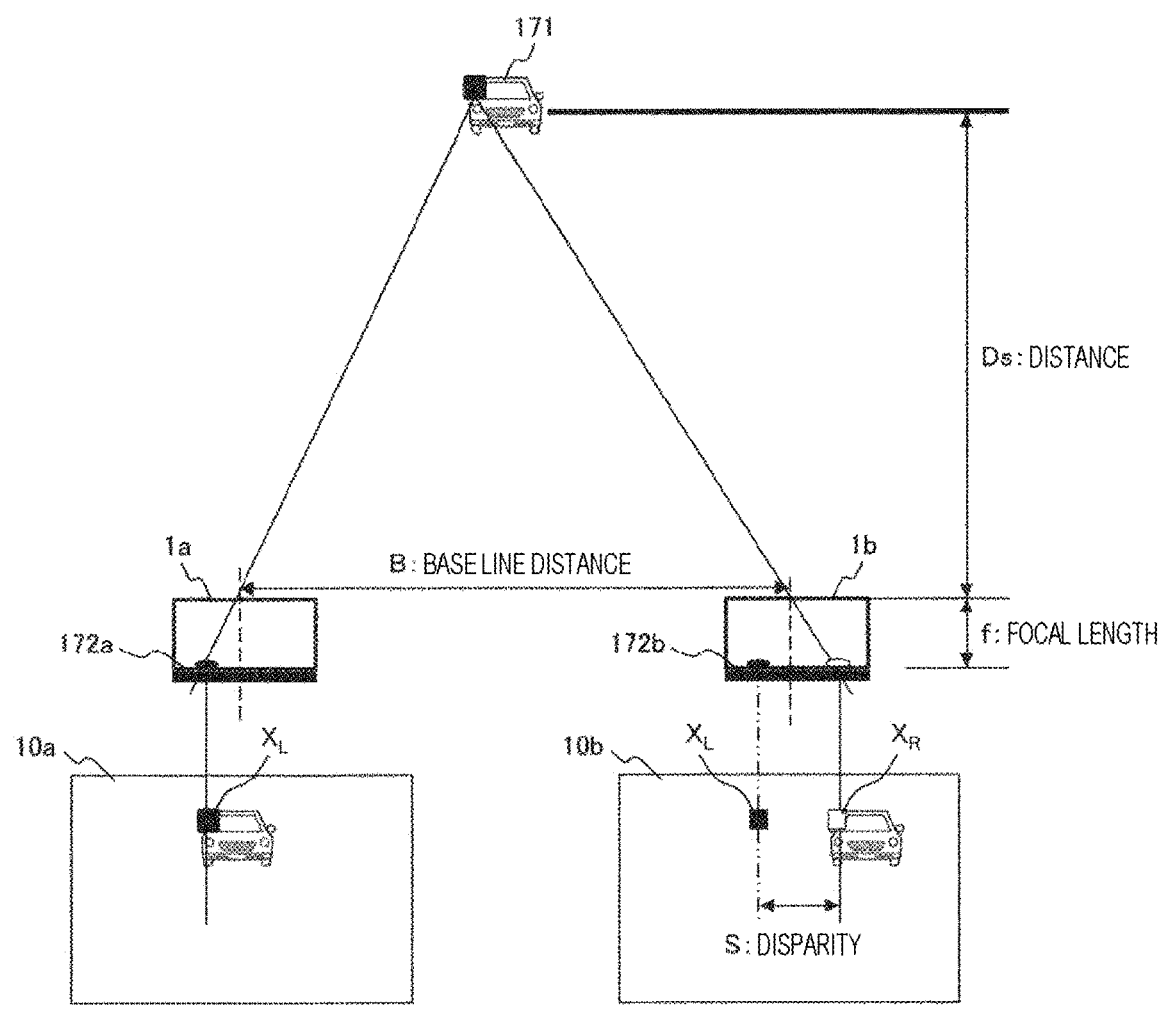
FIG. 17 is a diagram illustrating inter-vehicle distance measurement by a stereo camera.

To obtain a distance to a measurement object 171 such as a preceding vehicle by using this stereo camera, the principle of triangulation is used as illustrated in FIG. 17. That is, in a case where the measurement object 171 is imaged, image data 10*a* of the measurement object 171 is imaged by a two-dimensional sensor 172*a* of a camera 1*a* on a left side, and image data 10*b* of the measurement object 171 is imaged by a two-dimensional sensor 172*b* of a camera 1*b* on a right side. When an optical axis of the camera 1*a* and an optical axis of the camera 1*b* are parallel, a base line distance is B (m), and a focal distance is f (pixel), given that imaged positions of the same portion of the measurement object 171 on each image data are $X_L$ and $X_R$, a distance Ds from the stereo camera to the measurement object 171 can be calculated with Formula 7.

[Formula 7]

$$Ds = B \cdot \frac{f}{(x_L - x_R)}$$ (Formula 7)

In this way, in the present embodiment, a distance Ds to a preceding vehicle is measured with a stereo camera, and in a case where the distance Ds is shorter than a predetermined threshold, the preceding vehicle is determined to be close, and thresholds (upper thresholds th_u1 and th_u2) of brightness of light in surrounding environment used for determination of light-on or light-off are corrected.

Specific control according to the present embodiment will be described by using FIGS. 18 and 19.

The automatic light system of the second embodiment also acquires image data 10 and vehicle information (S31) and recognizes light in surrounding environment (S32), as in FIG. 3 of the first embodiment. After that, light mode determination processing (S33) of the present embodiment illustrated in FIG. 18 is performed, and finally, light-on/light-off of the lighting unit 7 is controlled according to a light mode determined by a method of the present embodiment (S34).

Figure 18:
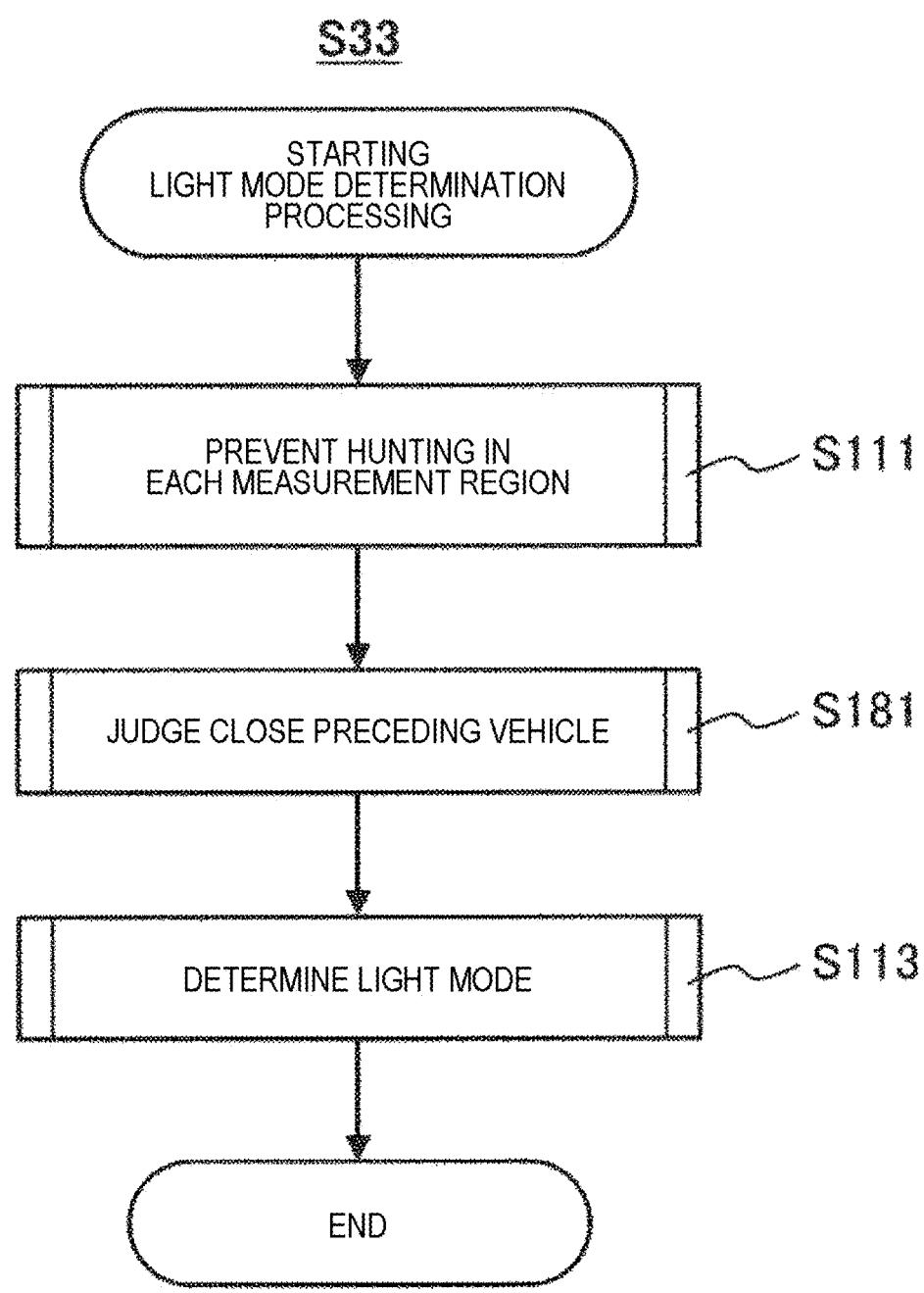
FIG. 18 is a flowchart of the second embodiment.

The "light mode determination" processing of the present embodiment illustrated in FIG. 18 is the one in which S112 "Judge low speed" in FIG. 11 that describes "Determine light mode" in the first embodiment is replaced by S181 "Judge close preceding vehicle" in FIG. 18. It should be noted that, because the processing in S111 and processing in S113 in FIG. 18 are similar to the processing in FIG. 11 of the first embodiment, duplicate description will be omitted below.

Figure 19:
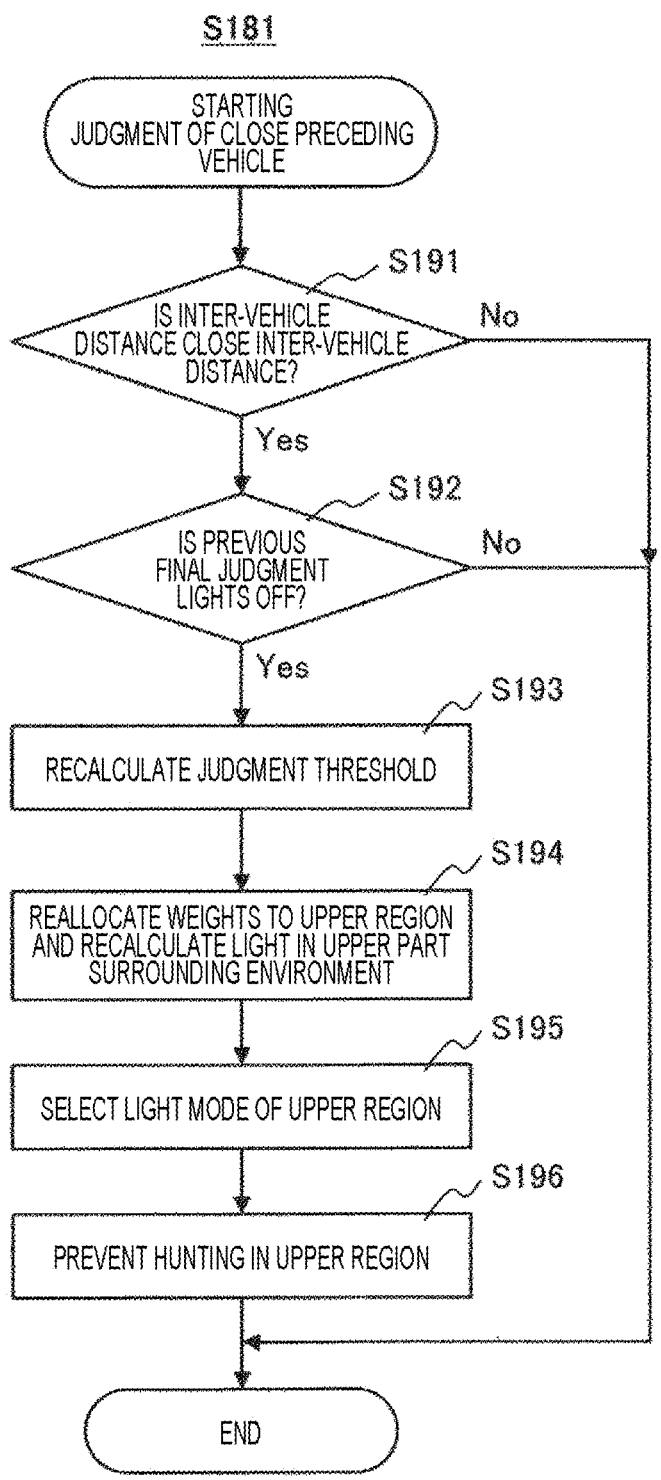
FIG. 19 is a flowchart of the second embodiment.

FIG. 19 is a flowchart illustrating a detail of S181 "Judge close preceding vehicle" processing. As illustrated here, first, whether an inter-vehicle distance Ds is within a range of a preset close inter-vehicle distance (for example, 15 m) is judged in S191, and if not within the range, the processing in S181 ends without changing a threshold for determination of a light mode. Furthermore, in a case where the inter-vehicle distance Ds is within the range of the preset approaching inter-vehicle distance, in S192, whether the light mode judged in a previous judgment cycle is "lights OFF" is judged, and if not (in a case where the light mode Is either "headlights ON" or "small lights ON"), the processing in S181 ends without changing a threshold for determination of a light mode.

Meanwhile, in a case where the light mode judged in the previous judgment cycle is "lights OFF" in S192, a judgment threshold is recalculated by using Formula 8 in S193.

[Formula 8]

$$th\_new = th - R \cdot (1 - e^{-\alpha(D_f - D_s)^2})$$ (Formula 8)

Here, in Formula 8, th_new represents a recalculated judgment threshold, th represents an initial judgment threshold, R represents a threshold adjustment range, Ds represents an inter-vehicle distance, $D_f$ represents a preset distance range (timing of approaching vehicle determination processing), and a represents an adjustment variable for calculation.

Subsequently, in S194, light in upper part surrounding environment when the preceding vehicle is close is recalculated by using Formula 9.

[Formula 9]

$$\bar{x} = \frac{\sum_{i=1}^{n} x_i w_i}{\sum_{i=1}^{n} w_i}$$ (Formula 9)

In Formula 9, the left-hand side represents light in upper part surrounding environment, and on the right-hand side, $x_i$ represents average brightness of each measurement region, $w_i$ represents weight distribution of each measurement region by an approaching vehicle, and n represents the number of set measurement regions.

It should be noted that, in the present embodiment, the weight distribution $w_i$ of each measurement region is defined with Formula 10.

[Formula 10]

$$w_i = \begin{cases} 2, & \text{Upper measurement region in} \\ & \text{which preceding vehicle is not present} \\ 1, & \text{Upper measurement region in} \\ & \text{which preceding vehicle is present} \end{cases} \quad \text{(Formula 10)}$$

After that, in S195, a light mode of an upper region is selected by using a threshold recalculated in S193 and the light in upper part surrounding environment calculated in S194, and in S196, after hunting prevention processing is performed by a method similar to the method in FIG. 12, the processing in S181 ends, and the processing proceeds to light mode determination processing (S113) in FIG. 18.

In the processing in FIG. 14 of the first embodiment, or the like, a light mode is determined by using a single camera and estimating an inter-vehicle distance by calculation. However, in the present embodiment, a light mode can be set more appropriately by using a stereo camera to accurately measure an inter-vehicle distance, and taking into account the accurate inter-vehicle distance. As a result, compared with the first embodiment, it is possible to reduce a situation where lights are turned on unnecessarily, reduce waste of a battery, and perform light control that matches sense of a driver.

Third Embodiment

Next, an automatic light system according to a third embodiment of the present invention will be described. It should be noted that duplicate description will be omitted for a point in common with the above-described embodiments.

Figure 20:
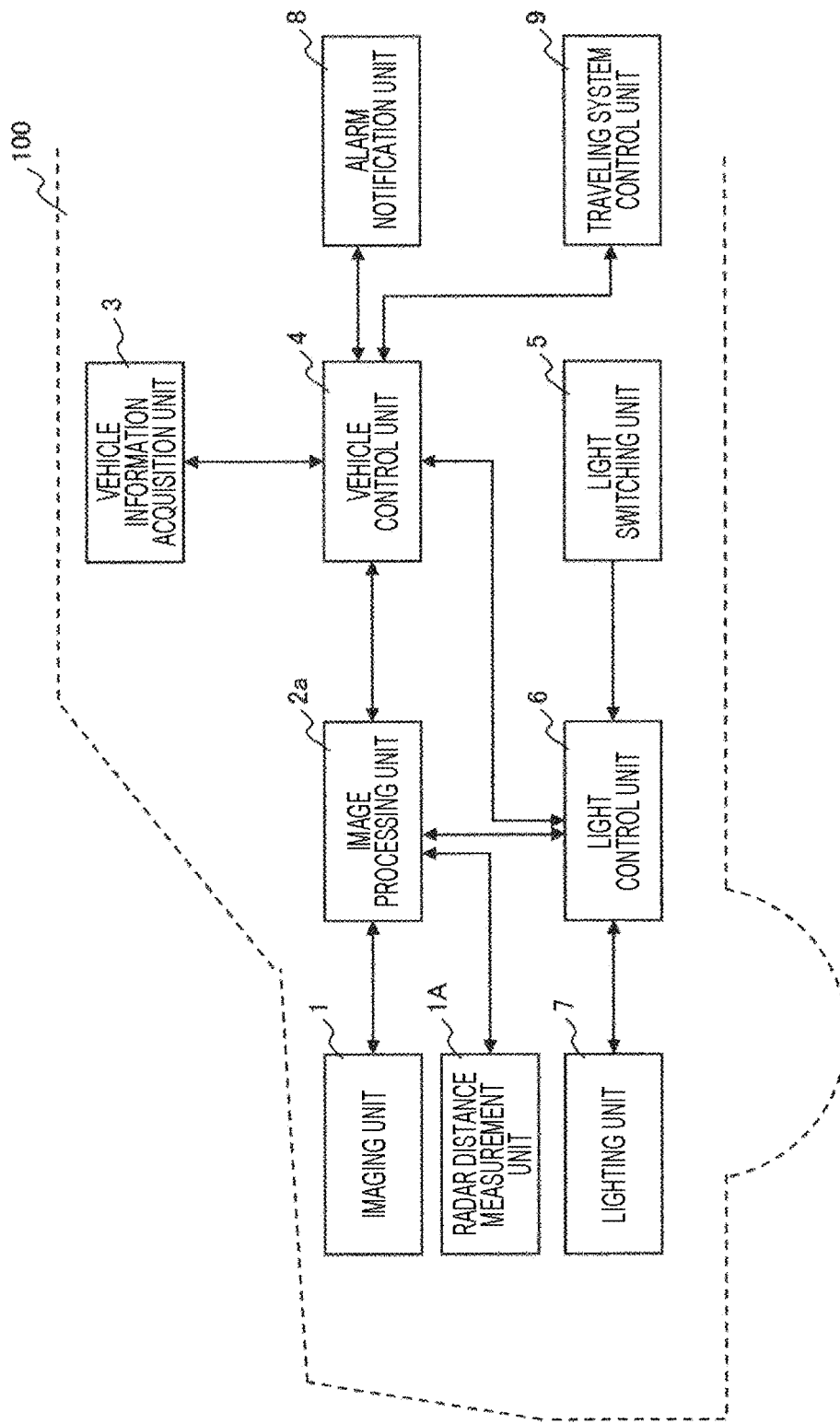
FIG. 20 is a functional block diagram according to a third embodiment.
Figure 21:
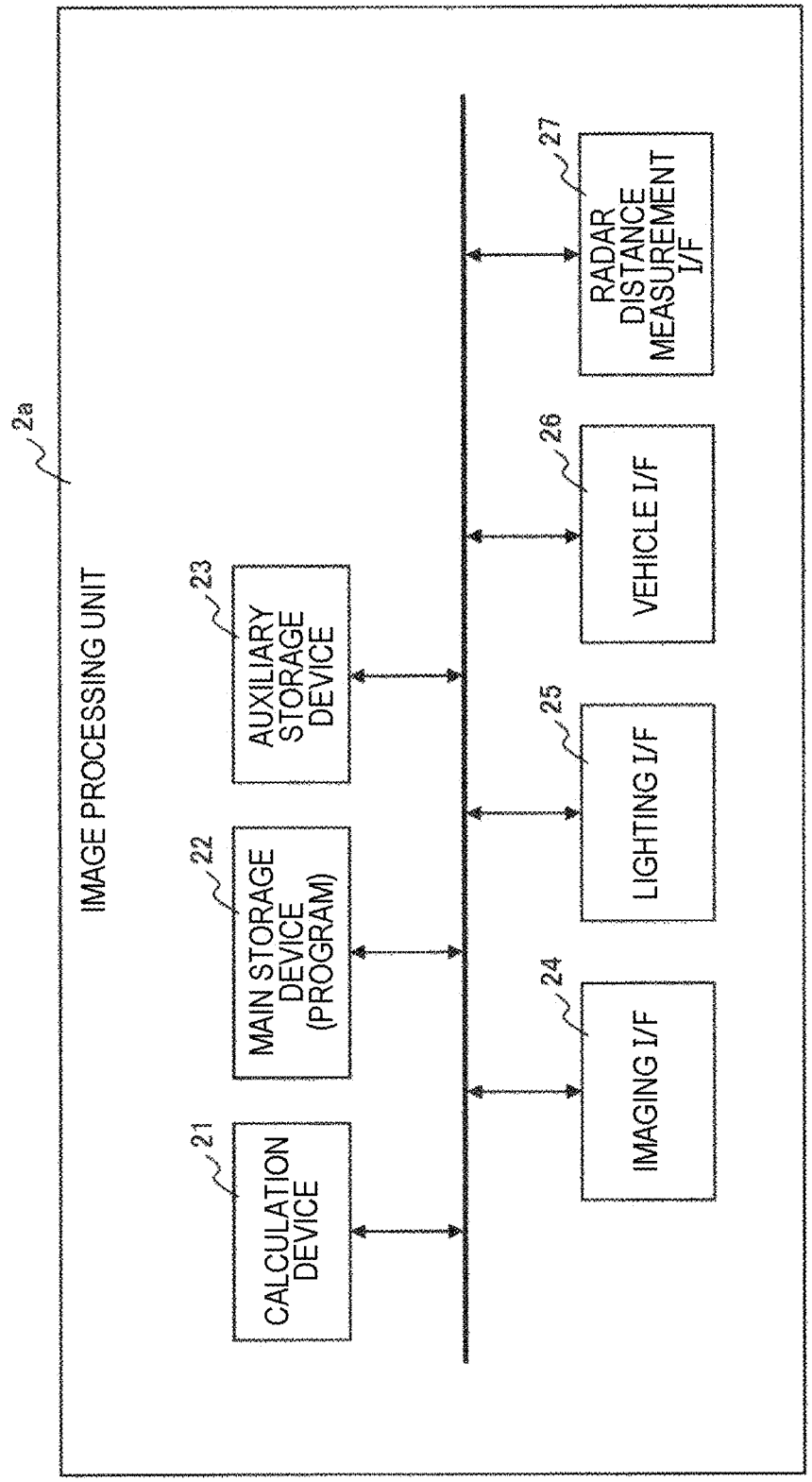
FIG. 21 is a block diagram of an image processing unit in the third embodiment.

FIG. 20 is a functional block diagram of an automatic light system of the present embodiment. In the second embodiment, a light mode is determined by using a stereo camera to measure an inter-vehicle distance to a preceding vehicle and by using a corresponding threshold. However, in the present embodiment, a light mode is determined by using a radar distance measurement unit 1A to measure an inter-vehicle distance to the preceding vehicle and by using a corresponding threshold. Because a processing routine of the present embodiment is similar to processing routines described in FIG. 18 and FIG. 19 in the second embodiment, duplicate description will be omitted.

The radar distance measurement unit 1A performs distance measurement with light irradiation by a millimeter wave radar, Light Detection and Ranging (LIDAR), or the like, and reception of reflected light from the light irradiation. It should be noted that an image processing unit 2a of the present embodiment is the one in which a radar distance measurement I/F 27 for connection to the radar distance measurement unit 1A is added to a configuration of the image processing unit 2 illustrated in FIG. 2.

As described above, also in a configuration of the present embodiment using the radar distance measurement unit 1A, similarly to the second embodiment, a light mode can be set more appropriately by accurately measuring an inter-vehicle distance, and taking into account the accurate inter-vehicle distance. As a result, it is possible to reduce waste of a battery, and perform light control that matches sense of a driver.

Fourth Embodiment

Next, an automatic light system according to a fourth embodiment of the present invention will be described. The present embodiment is different from the above-mentioned embodiments in that map information and own company position information are used for determination of a light mode. It should be noted that duplicate description will be omitted for a point in common with the above-described embodiments.

Figure 22:
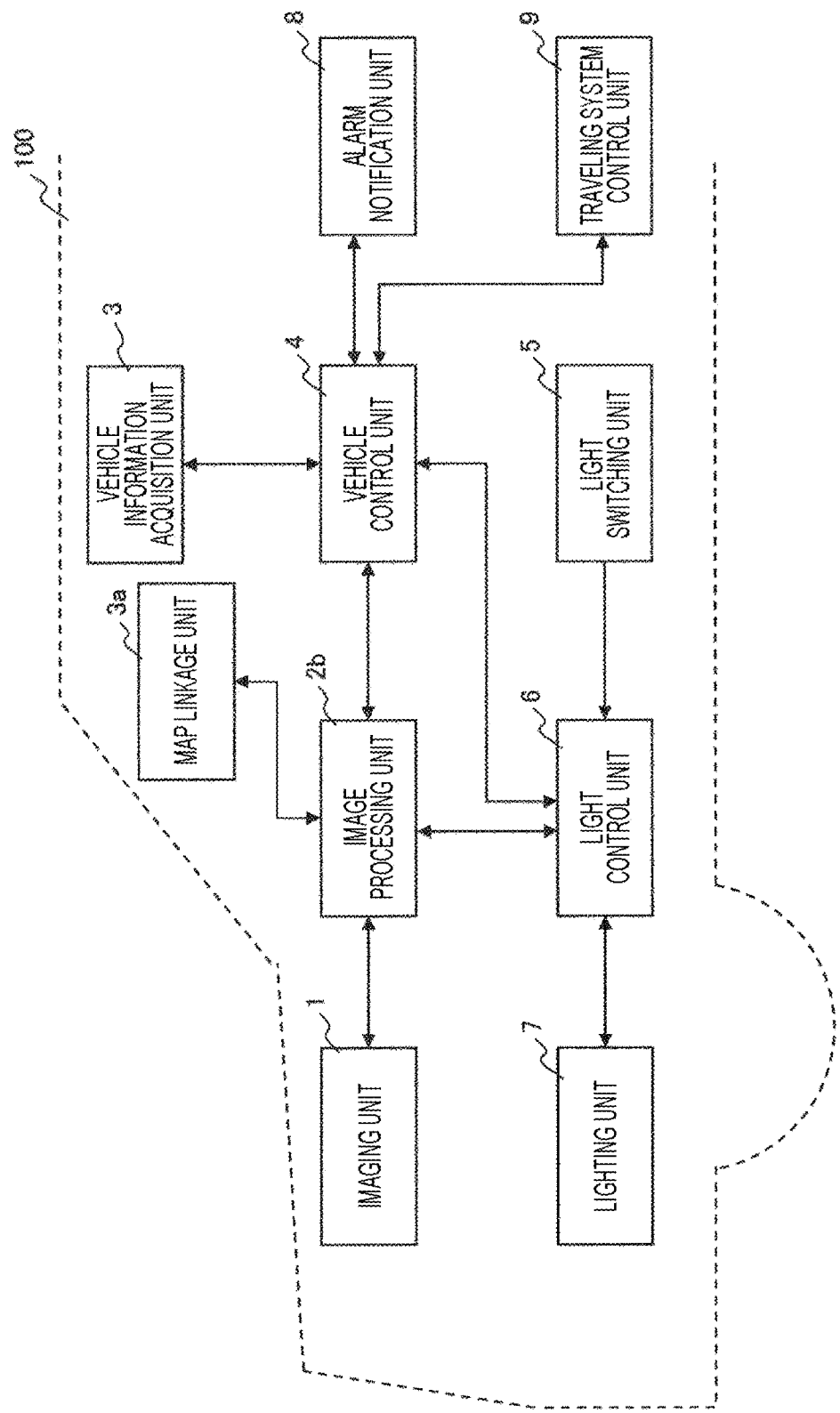
FIG. 22 is a functional block diagram in a fourth embodiment.

FIG. 22 is a functional block diagram of an automatic light system of the present embodiment. As illustrated here, the automatic light system of the present embodiment is the one in which a map linkage unit 3a is added to a configuration of the first embodiment, and correspondingly, the image processing unit 2 is replaced by an image processing unit 2b.

Figure 23:
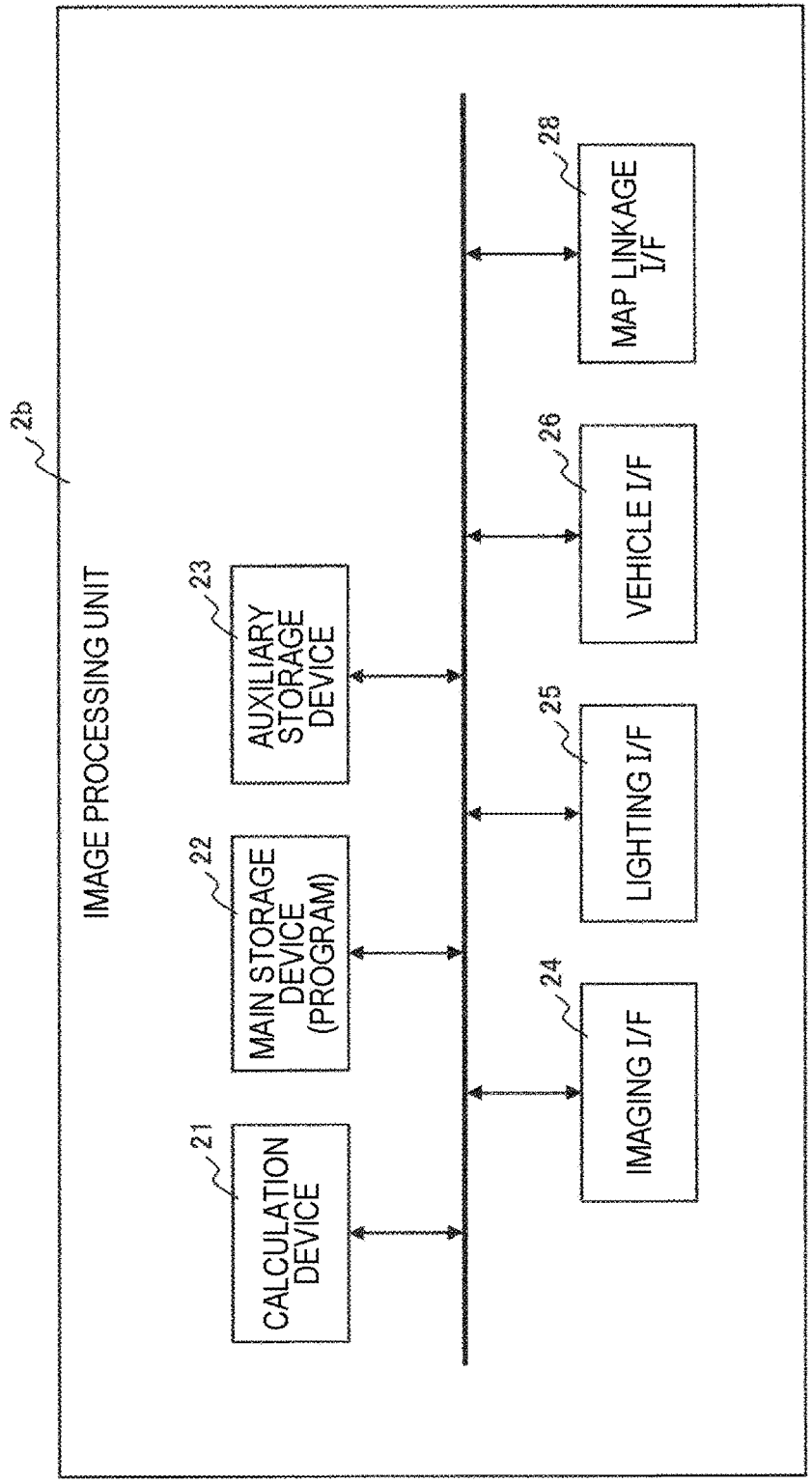
FIG. 23 is a block diagram of an image processing unit in the fourth embodiment.

FIG. 23 is a functional block diagram illustrating the image processing unit 2b of the present embodiment. Although the image processing unit 2b of the present embodiment is substantially equivalent to the image processing unit 2 of the first embodiment, the image processing unit 2b includes a map linkage I/F 28 for connection to the map linkage unit 3a.

FIG. 24 is a functional block diagram of the map linkage unit 3a. As illustrated here, the map linkage unit 3a includes a calculation device 241, a main storage device 242 that stores a map database or a program, an auxiliary storage device 243, an image and display I/F 244, a positioning I/F 245 that receives a positioning signal from a GPS receiver that is not illustrated, a sensing I/F 246 that receives external information from the imaging unit 1 or a radar distance measurement 1A, and a vehicle I/F 247.

This map linkage unit 3a forwards to and stores in the auxiliary storage device 243 own vehicle information (speed, or the like), GPS satellite reception information, or another sensing information (for example, image data or radar distance measurement of an area in front of an own vehicle, or the like), and estimates a position and movement direction of the own vehicle on the basis of information stored in the auxiliary storage device 243. Furthermore, the calculation device 241 transmits a control signal to a desired interface on the basis of a program stored in the main storage device 242. The position and movement direction of the own vehicle estimated by the calculation device 241 are transmitted to an image and display I/F 234 along with the map information.

Then, in the map linkage unit 3a, the position of the own vehicle is calculated (positioned) as absolute coordinates on the basis of the positioning signal, and the position of the own vehicle is calculated as a relative change from a positioning position on the basis of the external information. Further, map matching processing is performed in which the calculated position of the own vehicle is corrected to a position on a road in a map by using the map database. As a result of these processing, in the map linkage unit 3a, a movement direction can be estimated with high accuracy on the basis of an estimated position of the own vehicle on a road and direction information.

In addition to a shape of a road in a movement direction of the vehicle 100 and a position of a tunnel, positions of lights in the tunnel is input in the image processing unit 2b via the map linkage I/F 28. By using these, weights for a plurality of upper measurement regions or a threshold for light mode judgment can be previously switched, and headlights can be previously turned on at a place, such as a tunnel, where lighting is required. Therefore, compared with the above-described embodiments, switching of a light mode can be further appropriate, and comfort of a driver can be further enhanced.

It should be noted that the present invention is not limited to the above-described embodiments, but also includes various variations. For example, the description of the embodiments, which has been provided above in detail, is intended to describe the present invention in an easily understandable manner and accordingly, the above-described embodiments are not necessarily limited to the one that includes all the configurations described above. Furthermore, it is possible to replace a part of the configuration of an embodiment with the configuration of another embodiment, and also possible to add, to the configuration of an embodiment, the configuration of another embodiment. Furthermore, it is also possible to add another configuration to a part of the configuration of each embodiment, delete a part of the configuration of each embodiment, and replace a part of the configuration of each embodiment with another configuration.

REFERENCE SIGNS LIST 100 vehicle
1 imaging unit
1a, 1b camera
1A radar distance measurement unit
2, 2a, 2b image processing unit
3 vehicle information acquisition unit
3a map linkage unit
4 vehicle control unit
5 light switching unit
6 light control unit
7 lighting unit
8 traveling system control unit
10, 10a, 10b image data
11 upper region
$A_0$ to $A_4$ upper measurement region
12 lower region
120 lower measurement region
13 preceding vehicle
21 calculation device
22 main storage device
23 auxiliary storage device
24 imaging interface
25 light control interface
26 vehicle interface
27 radar distance measurement interface
28 map linkage interface
171 measurement object
172a, 172b two-dimensional sensor

The invention claimed is:

1. An automatic light system configured to automatically turn on or turn off lights of a vehicle in accordance with surrounding environment, the automatic light system comprising:
    an imaging device configured to image an area in front of the vehicle and generate image data;
    an image processor configured to generate light mode information, with which turning on or turning off of the lights is controlled, on the basis of brightness in an upper region and lower region of the image data; and
    a light controller configured to control the lights on the basis of the light mode information,
    wherein the image processor is configured to set a higher weight to a measurement region in a movement direction of the vehicle from among a plurality of measurement regions set in the upper region and set a lower weight to another measurement region to calculate the brightness in the upper region, and generate the light mode information on the basis of the brightness in the upper region.

2. The automatic light system according to claim 1, wherein the image processor is configured to generate light mode information of lights OFF in a case where the calculated brightness of the upper region is brighter than a first threshold, generate light mode information of small lights ON in a case where the calculated brightness of the upper region is darker than the first threshold and brighter than a second threshold, and generate light mode information of headlights ON in a case where the calculated brightness of the upper region is darker than the second threshold.

3. The automatic light system according to claim 1, wherein the image processor is configured to calculate average hue of the upper region, generate light mode information of lights OFF in a case where the calculated brightness of the upper region is brighter than the first threshold, and the average hue is within a reference range, generate light mode information of small lights ON in a case where the calculated brightness of the upper region is brighter than the first threshold, and the average hue is out of the reference range, generate light mode information of small lights ON in a case where the calculated brightness of the upper region is darker than the first threshold and brighter than a second threshold, and generate light mode information of headlights ON in a case where the calculated brightness of the upper region is darker than the second threshold.

4. The automatic light system according to claim 2, wherein the image processor is configured to reduce the first threshold or the second threshold in a case where vehicle speed of the vehicle is in a state of any one of stop, low speed, or deceleration, and current light mode information is lights OFF.

5. The automatic light system according to claim 2, wherein the image processor is configured to reduce the first threshold or the second threshold in a case where vehicle body color of a preceding vehicle is black or dark color, the vehicle body color being included in the image data.

6. The automatic light system according to claim 2, further comprising an inter-vehicle distance measurement device configured to measure an inter-vehicle distance to a preceding vehicle,
    wherein the image processor is configured to reduce the first threshold or the second threshold in a case where the inter-vehicle distance is shorter than a predetermined distance.

7. The automatic light system according to claim 6, wherein the inter-vehicle distance measurement device is a stereo camera or a radar distance measurement device.

8. The automatic light system according to claim 1, further comprising a map storage configured to store a map database,
    wherein the image processor is configured to perform weighting on each judgment region according to a movement direction of the vehicle judged on the basis of road information in the map database.

9. The automatic light system according to claim 1, wherein a judgment cycle of the light mode information is a cycle that becomes short in a case where vehicle speed of the vehicle is fast.

* * * * *